US011509477B1

(12) United States Patent
Poder et al.

(10) Patent No.: US 11,509,477 B1
(45) Date of Patent: *Nov. 22, 2022

(54) USER DATA VALIDATION FOR DIGITAL IDENTIFICATIONS

(71) Applicant: Idemia Identity & Security USA LLC, Reston, VA (US)

(72) Inventors: Daniel Poder, Brookline, MA (US); Richard Austin Huber, Weehawken, NJ (US)

(73) Assignee: Idemia Identity & Security USA LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,267

(22) Filed: Oct. 7, 2019

Related U.S. Application Data

(63) Continuation of application No. 14/984,941, filed on Dec. 30, 2015, now Pat. No. 10,439,815.

(60) Provisional application No. 62/098,016, filed on Dec. 30, 2014.

(51) Int. Cl.
*H04L 9/32* (2006.01)
*H04L 9/40* (2022.01)

(52) U.S. Cl.
CPC .......... *H04L 9/3226* (2013.01); *H04L 9/3297* (2013.01); *H04L 63/0428* (2013.01)

(58) Field of Classification Search
CPC .......................... H04L 9/3226; H04L 63/0428
USPC .................................................. 713/182–186
See application file for complete search history.

(56) References Cited

U.S. PATENT DOCUMENTS

| | | | | |
|---|---|---|---|---|
| 9,397,980 | B1* | 7/2016 | Chen | G06F 21/36 |
| 9,424,573 | B2* | 8/2016 | von Mueller | G06Q 20/367 |
| 2005/0216769 | A1* | 9/2005 | Matsuoka | H04L 63/0823 |
| | | | | 726/5 |
| 2008/0116282 | A1* | 5/2008 | Sharra | G06F 16/955 |
| | | | | 707/E17.112 |
| 2009/0300744 | A1* | 12/2009 | Guo | H04L 63/0823 |
| | | | | 726/7 |

(Continued)

OTHER PUBLICATIONS

Shah et al., "A P2P-Based Architecture for Secure Software Delivery Using Volunteer Assistance," 2008 Eighth International Conference on Peer-to-Peer Computing Year: 2008 pp. 131-139.*

(Continued)

*Primary Examiner* — Roderick Tolentino
(74) *Attorney, Agent, or Firm* — Armstrong Teasdale LLP

(57) ABSTRACT

In general, one innovative aspect of the subject matter described in this specification may be embodied in methods that may include validating user data pages extracted from a digital identification in circumstances where a user device that includes the digital identification is either unavailable or presently lacks network connectivity. For instance, an authorized device may be used to extract user data pages from the digital identification by either exchanging communications with the user device using a proximity-based data exchange protocol, or by using a physical identification card to identify the digital identification on a user record. The user data pages may then be validated by comparing checksums associated with user data pages against the checksums within the user record, and decrypting the user data pages using a decryption key that is variably designated by a security status assigned to the digital identification.

20 Claims, 23 Drawing Sheets

(56) References Cited

U.S. PATENT DOCUMENTS

| | | | | |
|---|---|---|---|---|
| 2009/0328174 A1* | 12/2009 | Cen | ............... | G06F 21/44 |
| | | | | 726/7 |
| 2010/0082448 A1* | 4/2010 | Lin | ............... | G06F 21/10 |
| | | | | 705/26.1 |
| 2010/0205448 A1* | 8/2010 | Tarhan | ............ | G06F 21/33 |
| | | | | 713/185 |
| 2013/0077779 A1* | 3/2013 | Batra | ............ | H04L 9/0833 |
| | | | | 380/31 |
| 2013/0276048 A1* | 10/2013 | Krasic | ......... | H04N 21/234309 |
| | | | | 725/116 |
| 2014/0351911 A1* | 11/2014 | Yang | ........... | H04L 63/0838 |
| | | | | 726/7 |
| 2015/0237026 A1* | 8/2015 | Kumar | ............ | G06F 21/44 |
| | | | | 726/28 |
| 2015/0332023 A1* | 11/2015 | Gisolfi | .......... | G06F 21/6209 |
| | | | | 726/31 |
| 2015/0365400 A1* | 12/2015 | Cox | ............... | H04L 63/18 |
| | | | | 726/7 |
| 2016/0098698 A1* | 4/2016 | Gopalakrishna | ..... | G06Q 20/322 |
| | | | | 705/71 |
| 2017/0185817 A1* | 6/2017 | Pogorelik | ......... | G06K 7/10722 |

OTHER PUBLICATIONS

Koganti et al., "Authentication protocols using encryption techniques," 2016 International Conference on Control, Instrumentation, Communication and Computational Technologies (ICCICCT) Year: 2016 pp. 74-80.*

* cited by examiner

USER DATA VALIDATION FOR DIGITAL IDENTIFICATIONS

CROSS-REFERENCE TO RELATED APPLICATIONS

This application is a continuation of U.S. application Ser. No. 14/984,941, filed Dec. 30, 2015 which claims priority to U.S. Application Ser. No. 62/098,016, filed on Dec. 30, 2014.

FIELD

The present specification is related generally to digital identifications.

BACKGROUND

Physical identification cards such as driver licenses are commonly used for verifying the identity of an individual, providing access to restricted areas, or authorizing an individual to purchase age-restricted content.

SUMMARY

Physical identification cards are provided by issuing authorities such as government agencies or companies to users during an issuance process. Such physical identification cards include user information that is used to identify the identity of the user, and in some instances, provide access or privileges to the user. However, because security features included in physical identification cards are often preset during the issuance process, users are often susceptible to risk of fraud and counterfeiting when the preset security features are compromised. Additionally, if a user's information changes, e.g., residence address, the user may need to wait for a new physical identification card to be printed and mailed to the user.

In general, one innovative aspect of the subject matter described in this specification may be embodied in methods that may include validating user data pages extracted from a digital identification in circumstances where a user device that includes the digital identification is either unavailable or presently lacks network connectivity. For instance, an authorized device may be used to extract user data pages from the digital identification by either exchanging communications with the user device using a proximity-based data exchange protocol, or by using a physical identification card to identify the digital identification on a user record. The user data pages may then be validated by comparing checksums associated with user data pages against the checksums within the user record, and decrypting the user data pages using a decryption key that is variably designated by a security status assigned to the digital identification.

Implementations may include one or more of the following features. For example, a computer-implemented method may include establishing a connection between a user device and an authorized device; determining, by the authorized device, that a user device of a user is presently unable to connect to a digital identification server; receiving, by the authorized device and from the user device, data including (i) an identifier associated with the user, (ii) encrypted user information from a digital identification of the user, the encrypted user information including a first checksum, and (iii) a timestamp of encryption; selecting, by the authorized device and from a plurality of decryption keys and based at least on the timestamp of encryption included in the encrypted user information, a variable decryption key that corresponds to an encryption used to encrypt the encrypted user information; generating, by the authorized device, a set of decrypted user information from the digital identification on the user device based at least on decrypting the encrypted user information from the digital identification on the user device using the variable decryption key; identifying a second checksum associated with the decrypted user information from the digital identification on the user device; determining whether the first checksum matches the second checksum; and providing, by the authorized device, a validation result of the decrypted user information within the digital identification on the user device.

Other versions include corresponding systems, and computer programs, configured to perform the actions of the methods encoded on computer storage devices.

One or more implementations may include the following optional features. For example, in some implementations, the plurality of decryption keys are stored on the digital identification server, and identifying the second checksum associated with the decrypted user information from the digital identification on the user device includes obtaining a checksum, associated with the user information, that is stored on the digital identifications server.

In some implementations, identifying a second checksum associated with the decrypted user information from the digital identification on the user device includes: receiving, by the authorized device and from the digital identification server, a protocol to generate the second checksum from decrypted user information; storing, by the authorized device, the received protocol in a local cache on the authorized device; and generating the second checksum using the decrypted user information and the protocol.

In some implementations, the authorized device is presently unable to connect to the digital identification server.

In some implementations, the second checksum associated with the user information within the digital identification and the variable decryption key for the encrypted user information are each periodically updated by the digital identification server.

In some implementations, selecting the variable decryption key that corresponds to the encryption used to encrypt the encrypted user information includes: determining, based at least on the first checksum associated with the encrypted user information, a last recorded data synchronization between the user device and the digital identification server; identifying a plurality of decryption keys generated during a time frame that includes a time stamp associated with the last recorded data synchronization; and selecting a decryption key, from among the plurality of decryption keys generated during a time frame that includes a time stamp associated with the last recorded data synchronization, based at least on the received encrypted user information from the digital identification of the user.

In some implementations, decrypting the encrypted user information from the digital identification on the user device is based at least on the time stamp associated with the last recorded data synchronization between the user device and the digital identification server.

In some implementations, the connection between the user device and the authorized device includes a Bluetooth connection.

In some implementations, the connection between the user device and the authorized device includes a near field communication.

In some implementations, the connection between the user device and the authorized device is capable to transmitting visual information between the authorized device and the user device.

In some implementations, the connection between the user device and the authorized device is capable to transmitting audible information between the authorized device and the user device.

In some implementations, the method includes determining a level of authentication of the digital identification of the user based on the timestamp.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

Figure 1A:
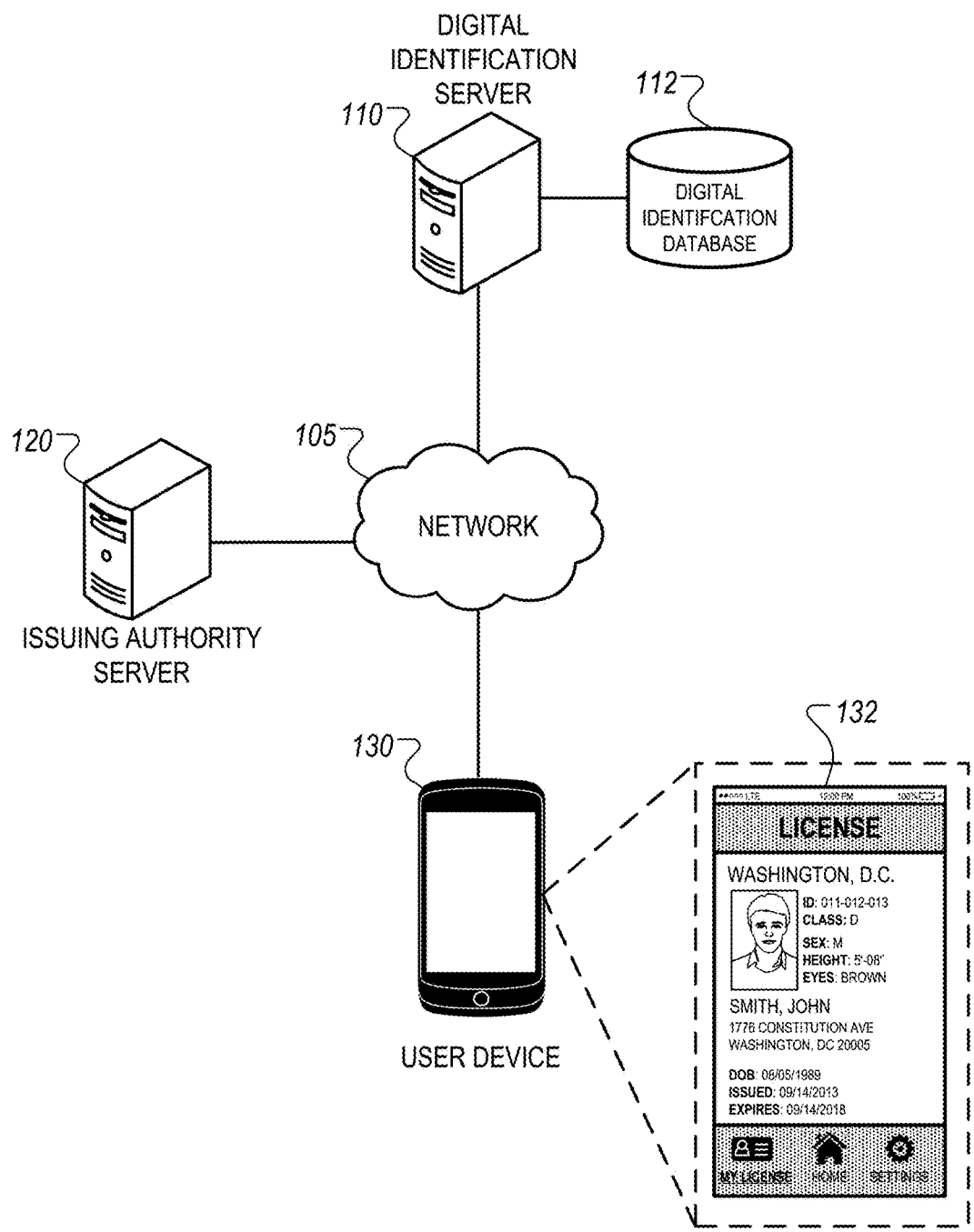
FIG. 1A illustrates a block diagram of an example system for providing digital identifications.

In general, this specification describes methods and systems for provisioning digital identifications for users. For instance, a digital identification may be complementary to a physical identification card and provided on a portable electronic device, enabling users to carry and display digital forms of physical identification cards on the portable electronic device. In some instances, the digital identification may include multiple security protocols to protect user information against fraud and counterfeiting.

A digital identification may be used by a user for several reasons. For instance, the digital identification may be used to verify the identity of a user at various retail locations that require age verification (e.g., alcohol stores, gun stores, etc.), airports, locations of financial transactions (e.g., bank offices, lender and other financial officers, etc.), healthcare institutions (e.g., hospitals, doctor's offices, etc.), and/or government offices (e.g., post office, department of motor vehicles, etc.). In some instances, a user may use the digital identification to access privileged or otherwise restricted services and/or information. In this regard, the digital identification may be used as a substitute to a physical identification card in a user authentication process.

A "user" may refer to an individual. For example, a user may be an individual with a physical identification card that may be a driver's license issued by a department of motor vehicles of a territory or a municipality. In other instances, the identification card may be other types of identifications such as a social security card, a passport, a birth certificate, or other government or company-issued identification cards.

A user may be provided with a digital identification by enrolling into a digital identification program offered by a digital identification administrator. In some instances, the digital identification administrator may also be the issuing authority. In other instances, the digital identification administrator may be another organization that is authorized by the issuing authority to manage the issuance and maintenance of identification cards.

A user may opt to enroll into the digital identification program using various methods such as, for example, an online enrollment process, a form submission, or through an oral agreement with an authorized representative. The digital identification administrator may then create a user entry including user information in a digital identification database. For instance, the user information may include one or more of an email address, an identification number, a user photograph, and other types of demographic information (e.g., home address) associated with the user. The digital identification database may also indicate to the digital identification administrator that an entry for the user has been successfully created once the entry for the user has been created.

The enrollment process for the digital identification program may include the use of various methods to receive user information, such as, for example, the use of email, the use of a user token such as a personal identification number (PIN), and/or the use of user biometric parameters.

FIG. 1A illustrates a block diagram of an example system 100 for providing digital identifications. In general, the system 100 may be used for various processes associated with a digital identification 132. For instance, the system 100 may be used to initially enroll users into a digital identification program, and provision a digital identification 132 to enrolled users.

Briefly, the system 100 may include a digital identification server 110, an issuing authority server 120, and a user device 130 connected over a network 105. The digital identification server 110 may also be configured to exchange communications with a digital identification database 112. In addition, the user device 130 may display a digital identification 132 on a user interface presented to a user (e.g., a user or any other authorized user) on the user device 130. Although the digital identification 132 is depicted as a digital driver license in FIG. 1A, the digital identification 132 may alternatively be a digital form of any physical identification card issued to a user from various types of identification issuing authorities (e.g., a government agency or a company).

The system 100 may be used to periodically assign and update a security status associated with the digital identification 132 of each enrolled user. The security status associated with the digital identification 132 may be a set of configuration settings that control the digital identification 132. For example, a security status received by a user device 130 from the digital identification server 110 may specify that when the digital identification 132 is displayed on the user device 130 on a Monday, the digital identification 132 include a first credential data, and when the digital identification 132 is displayed on the user device 130 on a Tuesday, the digital identification 132 include a different, second credential data. Credential data may refer to information that is used to verify validity of user information. For example, credential data may include a particular image, a particular verification phrase, or a checksum of user information calculated with a particular checksum algorithm.

In another example, the security status may be used by the digital identification server 110 to indicate on the user device 130 whether the digital identification 132 is "valid" or "invalid" based on a verification procedure performed by the digital identification server 110. In other examples, the security status may variably include a set of user credential data at that are associated with the digital identification 132 over a particular period of time. The user credential data may refer to user-specific information used to verify the authenticity of the digital identification 132 and/or prevent fraudulent or unauthorized access of the digital identification 132. For instance, as described more particularly in FIG. 1B, the user credential data may be used with various security level protocols of the digital identification 132 where each level uses a different set of credential data and different detection techniques to identify the credential data for use in the verification of the digital identification 132.

In yet another example, the security status may be used by the digital identification server 110 to generate different representations of the digital identification 132 on the user device 130 based on the GPS location of the user device 130. In still another example, the security status may be used to adjust the access to specific information in the digital identification 132 based on the particular application of use (e.g., identity verification, age-restricted product access, etc.).

Additionally or alternatively, the security status may be used as a pattern of different user credential data used to generate a time-variant representation of the digital identification 132. For example, the security status may specify a combination of user credential data and values for each credential data. In such implementations, the security status may be used by the digital identification server 110 to detect patterns that indicate abnormal activity of the digital identification 132 (e.g., fraudulent use indicating by improper user credential data).

Accordingly, in some implementations, the security status may specify different sets of user credential data to be used under different conditions, and the user device 130 may update the security status based on information from the digital identification server 110.

In addition, the system 100 may use a set of security protocols to protect user information included in the digital identifications 132 of enrolled users, and verify the authenticity of the digital identification 132. As described more particularly with respect to FIG. 1B, the set of security protocols may describe various security protocols implemented by the digital identification server 110 using different types of variable user credential data, and detection techniques to perform a verification operation of the variable user credential data. For instance, the set of security protocols may be associated with "levels" that represent different protocol complexities, and different detection techniques of the variable user credential data. For example, level one security protocols may represent a protocol for verification that uses simpler credential data that may be more easily detectable by the human eye, whereas level three security protocols may represent a protocol for verification that uses complex credential data that may be encrypted and require the use of a detector device and a distributed private decryption key.

The set of security protocols may be additionally used to resist against unauthorized simulation or use of the digital identification 132. For example, as described throughout this specification, the security protocols may utilize various user credential data that are used to verify time-dependent information associated with the digital identification 132, designated by the assigned security status by the digital identification server 110. In addition, the set of security protocols may enable the verification of the digital identification 132 by authorized users such as, for example, transportation security officials, law enforcement officials, and/or other authorized personnel associated with the issuing authority.

In more detail, the network 105 may be configured to enable electronic communications between the digital identification server 110, the issuing authority server 120, and the user device 130. For instance, the network 105 may include Local Area Networks (LANs), wide area networks (WANs), Wi-Fi, or analog or digital wired and wireless networks. The network 105 may include multiple networks or subnetworks, each of which may include, for example, a wired or wireless data pathway. The network 105 may also include a circuit-switched network, a packet-switched data network, or any network capable of carrying electronic communications (e.g., data or voice communications). For example, the network 105 may include networks based on the Internet Protocol (IP), or other comparable technologies.

The digital identification server 110 may be a remote server that is monitored and operated by an organization or institution that is authorized by an identification issuing authority to provide the digital identification 132 to a user. In some instances, the organization or institution operating the digital identification server 110 may be an organization that is designated by the identification issuing authority to access identification information for a plurality of users who have been issued a physical identification card. In other instances, the organization or institution operating the digital identification server 110 may be the identification issuing authority (e.g., a government institution) that issues a plurality of users with a physical identification card.

The digital identification server 110 may coordinate and administer the backend processes that are involved in provisioning a digital identification to the plurality of users that have been issued a physical identification from the identification issuing authority. For instance, the digital identification server 110 may initiate processes to enroll users with the digital identification 132, and operate security protocols to detect potential fraudulent use or privacy breaches associated with the digital identifications. In some instances, the processes related to the digital identification 132, as described above, may be coordinated with the issuing authority server 120, to ensure that secure user information that includes personally identifiable information are not exposed during the provisioning of the digital identification 132.

As described, secure user information may refer to user information within the digital identification 132 that may include personally identifiable information associated with the user such as, for example, social security numbers, place of residence, and/or other demographic information that is associated with other types of information that the user considers private. In addition, the secure user information may include medical records of the user that are protected under the Health Insurance Portability and Accountability Act of 1996 (HIPAA). Access to the secure user information within the digital identification 132 may be restricted by the digital identification server 110 by the using particular authorization procedures (e.g., requiring of user access codes) to access the secure information on the user device 130.

The digital identification server 110 may exchange communications with the digital identification database 112, which includes user information for enrolled users and/or other configuration details related to the digital identification program. For instance, the digital identification database 112 may include a user entry associated with a user that includes account information associated with enrolled users, and any type of user information that may be provided by the user during a digital identification enrollment process.

In some implementations, the digital identification database 112 may include user entries for both users that are enrolled in the digital identification program and potential users that the digital identification server 110 has identified as users that are likely to enroll in the digital identification program. For example, the digital identification database 112 may include a field that indicates whether a user entry is associated with an enrolled user or a potential user. In such implementations, the digital identification database 112 may be accessed by the digital identification server 110 to retrieve user information for the digital identification 132 associated with an enrolled user, and user information for a candidate user in order to send an enrollment email that provides an enrollment code to the candidate user.

In some implementations, the user entry for enrolled users may be automatically created by the digital identification server 110 within the digital identification database 112. In such implementations, the user may submit an online enrollment form including a set of user fields for providing user information. In response, the digital identification server 110 may initiate a computer-implemented procedure that automatically generates a user entry for the user in the digital identification database 112 and inserts the values submitted for the set of user fields as user information that is included in the user entry.

In addition, the digital identification database 112 may include security status information associated with the digital identification 132, which is accessed by the digital identification server to assign a security status to the digital identification 132 at particular time periods. For instance, the security status information may specify the set of user credential data to be included in the digital identification 132, and a timestamp associated when each user credential data indicating when the data was generated by the digital identification server 110. In one example, the security status information may specify the values of user credential data such as access codes or user-selected passwords associated for the digital identification 132. In another example, the security status information may specify configurations for executing the security protocols to verify the digital identification 132. In yet another example, the security status information may include a set of instruction files that may be transmitted to user devices to periodically backup user data included in digital identifications 132 and/or enable separate detector devices to verify the digital identification 132 that is displayed by on a user device.

In some implementations, the digital identification server 110 may additionally exchange communications with an image server, which stores photographs associated with a user identification card. In some implementations, the image server may be operated by a separate entity or organization that operates the digital identification server 110. For instance, in such implementations, the image server may be operated by the identification issuing authority. In other implementations, the image server may be operated by the authorized issuing authority that also operates the digital identification server 110. In such implementations, the image server may be a sub-component of the digital identification server 110.

The issuing authority server 120 may be a remote server that is operated by the issuing authority and used to control access to secure user information that is included in physical identification cards issued by the issuing authority. For instance, the issuing authority server 120 may provide access to demographic information of users, historical information associated with users (e.g., previous identification cards issued, number of renewals, etc.), and/or other types of user information using authorization procedures that require validation of access credentials. For example, upon receiving a request for the secure user information by the digital identification server 110, the issuing authority server 120 may require an exchange of the access credentials to validate an authorized request.

The issuing authority server 120 may be queried by the digital identification server 110 for secure user information during a digital identification operation. For instance, during an enrollment process, after a user has opted to enroll into a digital identification program, the digital identification server 110 may query the issuing authority server 120 using a user identifier number to extract secure user information to be included in a generated digital identification 132. In another example, during a verification operation, the digital identification server 110 may access the issuing authority server 120 to determine whether a digital identification 132 for a user includes false user information indicative of a fraudulent digital identification 132.

In some implementations, the issuing authority server 120 may be configured with additional security protocols compared to the digital identification server 110 to protect sensitive user information associated with the user. For instance, in some instances, the issuing authority server 120 may be associated with a Federal government agency that manages nationwide programs that require specialized access (e.g., a government clearance). In such instances, the digital identification server 110 may be configured to access the secure user information stored within the issuing authority server 120 under a special security agreement that ensures that the exchange of the secure user information is controlled and regulated according to Federal privacy statutes. For example, the issuing authority server 120 may track information related to each exchange with the digital identification server 110 such that in the event that the digital identification server 110 determines that a particular digital identification 132 is invalid, a notification may be received by the issuing authority server 120 to take additional security measures to protect more sensitive user information that may be associated with, but not included in, the digital identification 132. In this regard, the communication exchange between the digital identification server 110 and the issuing authority server 120 may be utilized to ensure protection of user information beyond the user information included in the digital identification 132.

The user device 130 may be a portable electronic computing device that displays the digital identification 132 associated with a user. For instance, the user device 130 may be, for example, a smart phone, a tablet computer, a laptop computer, a personal digital assistant device, an electronic pad, a smart watch, a smart glass, or any electronic device with a display that is connected to a network.

The user device 130 exchanges communications with the digital identification server 110 to receive and transmit enrollment information related to the digital identification program, user data that is included in the digital identification, credential data used to verify the authenticity of the digital identification 132, and/or configuration settings that adjust the display of the digital identification 132 on the user device 130. For example, during an online enrollment process, the user may use the user device 130 to input user information and an assigned access code for the digital identification program, which is then transmitted to the digital identification server 110 to generate the digital identification 132. In another example, during a verification process, when the digital identification 132 is enabled on the user device 130, a data packet including credential data may be transmitted to the digital identification server 110 to determine whether the digital identification 132 is still valid or includes accurate information. In this example, if the digital identification server 110 determines that the credential data is valid, then the digital identification may be determined to be valid. Alternatively, if the digital identification server 110 determines that the credential data is not valid, then the digital identification 132 may be determined to be invalid.

In some implementations, the user device 130 may include a mobile application that exchanges communications to the digital identification server 110 as an application server. For example, the mobile application may be associated with a user account that is stored on the digital identification database 112. In addition, the mobile application may periodically exchange information related to the security status assigned by the digital identification server 110 to determine whether the digital identification 132 is valid. In some instances, the mobile application may additionally or alternatively include various displays of the digital application such that the mobile application may be used as a replacement form of identification to a physical identification card.

The digital identification 132 may be displayed on a user interface on the user device 130. For example, as shown in FIG. 1A, the digital identification 132 may include a photograph of a user, a user identifier, categorical data (e.g., identification classification), demographic information (e.g., sex, height, eye color, home address), date of birth, etc.), and issuance information associated with a corresponding physical identification card. In some instances, the digital identification may be a digital image of the corresponding physical identification card. In such implementations, the appearance of the digital identification may be substantially similar to the physical identification and consequently used as a duplicate form of identification.

In some implementations, the digital identification 132 may include one or more security protocols that utilize user credential data to verify and validate the digital identification 132. For instance, the digital identification 132 may include user credential data that include a set of visual indicators such as, for example, pattern overlays, holograms, kinegrams, or other types of graphical information that are visually detectable by human eyes. In other instances, the digital identification 132 may include user credential data that include a set of indicators that may not be detectable by human eyes but are optically detectable by a detector device that is capable of using light detection and manipulation techniques to extract information related to the set of indicators.

In addition, user credential data may be included in the digital identification 132 based on an assigned security status to the digital identification 132. For example, the security status may designate an expected user credential within the digital identification 132, such that either an authorized user (e.g., a law enforcement officer, or other individual using the digital identification to verify the identity of the user) or a detector device may compare a security feature displayed on the digital identification to the expected security feature to determine if the digital identification 132 is accurate and verified.

Figure 1B:
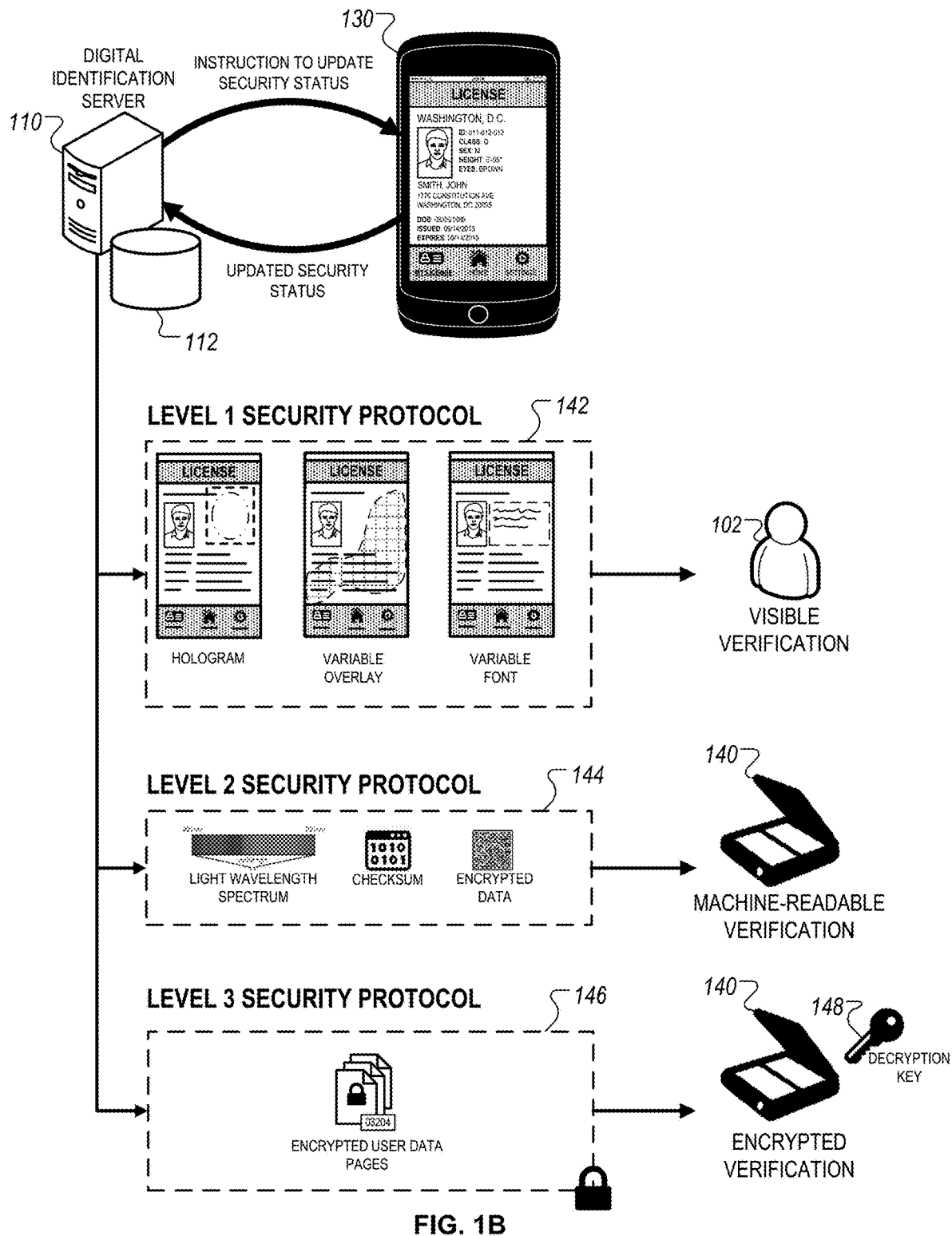
FIG. 1B illustrates example security protocols of a digital identification.

FIG. 1B illustrates exemplary security features of a digital identification. In general, the digital identifications server 110 and the user device 130 may regularly exchange communications to update the security status of the digital identification 132. For instance, the digital identification server 110 may transmit an instruction to update the security status with one or more user credential data to the user device 130 and the user device 130 may transmit information related to usage of the digital identification 132 to the digital identification server 110, which may then update the user entry in the digital identification database 112.

The digital identification server 110 may implement different levels of security features to protect user information in the digital identification 132 against fraud and counterfeiting. For instance, as shown in FIG. 1B, the digital identification server 110 may implement a set of level one features 142, a set of level two features 144, and a set of level three features 146.

In general, the level one security protocols 142 may include visible indicators that are displayed on the digital identification 132 such that the visible indicators are detectable by human eyes. For instance, the visible indicators displayed on the digital identification 132 may be visually detected by an authorized user 102 (e.g., security personnel outside a restricted area, a law enforcement officer, etc.) and verified against an expected visual indicator for the digital identification 132.

In some implementations, the level one security protocols 142 may include a three dimensional rotating photo of the user that rotates from left to right in a rendered composite image. In another example, the level one security protocols 142 may include a floating variable overlay that includes a hologram simulation layer that is updated based on the security status designated by the digital identification server 110. In another example, the level one security protocols 142 may include a variable virtual backdrop that is cycled based on display instructions from the digital identification server 110. For instance, the variable virtual backdrop may include a specified background pattern that is displayed on the digital identification 132.

In some implementations, the level one security protocols 142 may include variable graphic or font alterations that are adjusted based on a set of time-specific or condition-specific patterns designated by the digital identification server 110. For instance, the graphical or font alterations displayed on the digital identification 132 (e.g., text font, text color, logos or patterns) may be adjusted based on a set of instructions transmitted from the digital identification server 110 to the user device 130. In some instances, the one or more alterations may be implemented randomly from a list of available alterations included in the instructed transmitted from the digital identification server 110. In other instances, sets of alterations may be grouped together to generate different visual patterns based on a particular verification operation to be performed using the digital identification 132.

Level two security protocols 144 may include user credential data, included within the digital identification 132, that are visually imperceptible to humans but detectable with the use of a detector device 140. For instance, the detector device 140 may use optical scanning techniques to detect the user credential data, digital processing techniques to extract embedded data payloads, pattern recognition techniques to detect displayed patterns (e.g., QR codes), or other common forms of data authentication techniques employed in secure transactions.

In some instances, the detector device 140 may be capable of performing machine recognition techniques such as, for example, optical character recognition, optical word recognition, intelligent character recognition, or other forms of pattern recognition to identify features of interest within a captured image of the digital identification 132. In such instances, the detector device 140 may initially receive a pre-processed image of the digital identification 132, and then receive trained pattern data indicating the features of interest from the digital identification server 110. Using the trained pattern data, the detector device 140 may then recognize the features within the pre-processed image of the digital identification 132 based on performing machine recognition techniques.

In some implementations, the level two security protocols 144 may use multiple layers that are detectable to the detector device 140. For instance, the layers may either include different sets of graphical information, or a subset of graphical information associated with an overall graphic associated with user credential data. For example, the graphic information may include variable art, variable font, microprint, variable hologram overlays, or combinations of the different graphical information. In such implementations, the detector device 140 may receive a set of instructions from the digital identification 132 to extract individual layers based on the use of visual filters to deselect layers of interest that may include user credential data. In other examples, other light manipulations techniques may be applied to one or more of the layers to analyze the graphical information of the indicators within the digital identification 132.

In some implementations, the level two security protocols 144 may include rendering user credential data from user information within the digital identification 132. For instance, the digital information may include encrypted payloads with demographic and portrait data of the user associated with the digital identification 132, information related to the security status of the digital identification 132, or other types of encoded information. In other instances, the digital information may include a quick response (QR) code that is provided to the detector device, and used to retrieve user information. In other instances, the rendered user credential data may include user-unique audio watermarks (e.g., an audible message) or set of audio tones that may be provided to the detector device 140 for verification.

The level three security protocols 146 may include encrypted user data pages that include secure user information from the digital identification 132. For instance, user data generated on the user device 130 may be periodically transferred to the digital identification server 110 to update the security status and/or maintain updated credential information associated with the user. The digital identification server 110 may encrypt the user data pages generated on the user device 130 using a rotating key maintained and updated by the digital identification server 110. The encrypted user data pages may additionally be provided to the detector device along with a decryption key 148 to enable the detector device 140 to decrypt the encrypted user data pages and extract decrypted data payloads that include secure user information.

In some implementations, the level three security protocols 146 may include the use of a variable checksum associated with the encrypted user data pages to verify the secure information included in the encrypted user data pages. For instance, the variable checksum may include a timestamp that is used to identify when the security status of a particular data page was last updated by the digital identification server 110. The timestamp in the variable checksum may then be cross-referenced against the last identified checksum within the digital identification database 112 to determine if the particular encrypted data page reflects updated user information according to the most recent security status designated by the digital identification server 110.

Figure 2A:
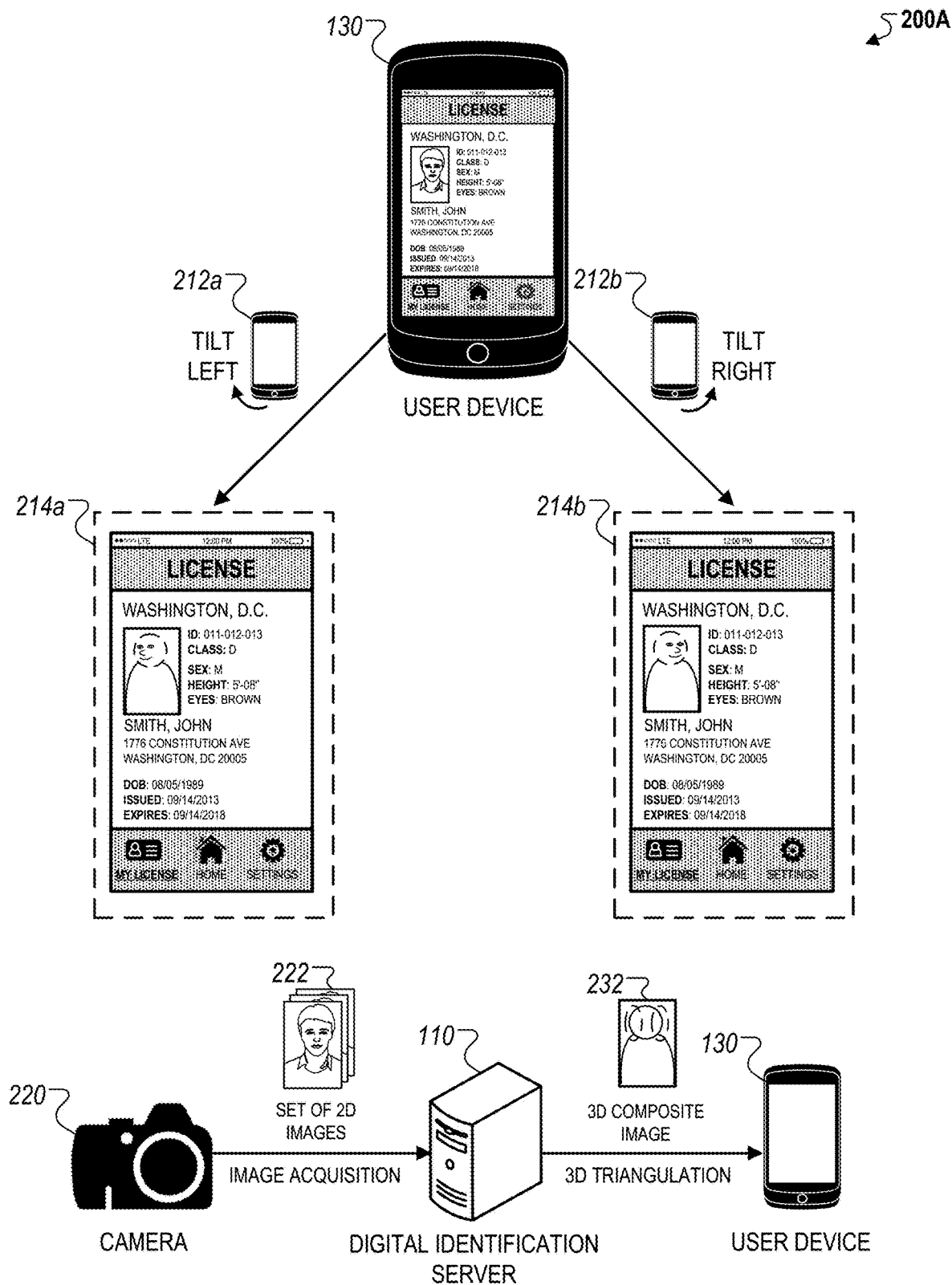
FIG. 2A illustrates a block diagram of an example system for generating a three dimensional composite image within a digital identification.

FIG. 2A illustrates a block diagram of a system 200A generating a three dimensional composite image within a digital identification. As depicted, the system 200A may include a camera 220 capturing a set of two dimensional images 222 of a user and transmitting the set of two dimensional images 222 to a digital identification server 230, and the digital identification server 230 generating a 3D composite image 232 using a three dimensional triangulation procedure, and transmitting the three dimensional composite image 232 to the user device 210.

In more detail, the three dimensional composite image 232 within the digital identification 132 may be an example of user credential data that may be used with the level one security protocols 142 as described in FIG. 1B. For instance, the three dimensional composite image 232 may include a representation of the user that may be used to visually verify the digital identification 132 when the user presents the digital identification 132 to an authorized agent. In some instances, the authorized agent may be an individual that uses the digital identification 132 to verify the identity of the user (e.g., security personnel, law enforcement officer, ticketing agent, etc.).

The three dimensional composite image 232 may be generated based on the set of two dimensional images 222 obtained from the camera 220. In some instances, the camera 220 may include a digital single lens reflex (DSLR) camera that is used to capture an image of the user. In other instances, other types of cameras such as a smartphone camera, a tablet pc camera, or a front-facing laptop camera may also be used to capture the image of the user.

Although FIG. 2A depicts the set of two dimensional images 222 being captured from the camera 220, in some implementations, the set of two dimensional images 222 may be captured by a camera of the user device 210. For instance, in such implementations, the user device 130 may include a mobile application that is capable of receiving user input that operates the camera of the user device 130. The mobile application may additionally provide instructions to the user on a user interface of the mobile application to take images of the user at different viewing angles.

In some implementations, the set of two dimensional images 222 may be captured using pre-defined viewing angles. For example, the set of two dimensional images 222 may include a subset of images that include a left profile of the user, a subset of images that include a right profile of the user, and another subset of the images that include a front view of the user.

In some implementations, after capturing the set of two dimensional images, the camera 220 may process the set of two dimensional images 222 prior to transmitting the set of two dimensional images 222 to the digital identification server 110. For instance, the camera 220 may perform a facial recognition operation to enhance features within the set of two dimensional images 222 that indicate the face of the user.

Alternatively, in other implementations, the set of two dimensional images 222 may be processed by the digital identification server 110. In such implementations, the digital identification server 110 may compare the set of two dimensional images 222 to a set of reference feature templates that include features that indicate a facial image. In this regard, the digital identification server 110 may use pattern recognition techniques to process the set of two dimensional facial images 222 based on the features included in the reference feature templates.

The digital identification server 110 may generate the three dimensional composite image 232 based on applying a three dimensional triangulation procedure on the set of two dimensional images 222. In general, the three dimensional triangulation procedure may include, for each two dimensional image within the set of two dimensional images 222, calibrating the image, determining depth information, and generating a depth map. The three dimensional triangulation procedure may additionally include comparing the depth maps of each image, identifying matching elements within the depths maps of multiple images, and generating the three dimensional composite image based on combining segments of individual images at corresponding locations of the matching locations.

In more detail, image calibration may include aligning facial structures within the individual images to a common coordinate axis between the set of two dimensional images 222. For example, the image calibration may be used to remove spatial offsets between locations of facial features (e.g., eyes, nose, ears, etc.) between individual images. In another example, the image calibration may include manipulating the set of two dimensional images 222 using a set of intrinsic or extrinsic parameters based on the capture settings of the camera 220. For instance, the parameters may include optical characteristics of the images (e.g., black level, gamma level, color saturation, etc.) or optical characteristics of the camera 220 (e.g., focal length, aperture, depth of field, etc.).

The depth information from each image within the set of two dimensional images 222 may be determined by estimating depth using numerous monocular cues within the image (e.g., text variations, gradients, defocus, color/haze, etc.) that are indicative of depth perception. In some instances, the digital identification server 110 may use depth calculation techniques that are initially trained using a training set that includes images with corresponding ground truth depths. The digital identification server 110 may then map image features of each image within the set of two dimensional images 222 to the features of training set, and then infer the depths for features of each image within the set of two dimensional images 222 based on comparing features extracted from each image within the set of two dimensional images 222 to the mapped features from the training set.

After extracting depth information, a depth map may be generated for each image within the set of images 222. For instance, the depth map may contain information relating to the distances of surfaces of facial features to a reference plane within each image. For example, the depth map may represent the distances of eyes, a nose, and ears relative to a background within each image. The distances within the depth map may be represented by different pixel values. For instance, the depth map may be a gray scale image where darker pixels indicate larger depth distances and lighter pixels indicate smaller distances. In some implementations, the depth map may be a gray scale image where pixel intensities vary between white to black.

The depth map for each image within the set of images 222 may then be compared to determine correspondences between individual depth maps for two or more features. For instance, a matching procedure where a plurality of depth maps are compared to identify matching elements within the plurality of depth maps may be used. The matching elements may be features within the depth maps that have similar depth information, indicating a high likelihood that they represent the same facial feature within different two dimensional images of different viewing angles.

In some implementations, the matching procedure may be iteratively performed such that the depth map of each individual image within the set of two dimensional images 222 is compared to the depth map of every other respective image within the set of two dimensional images 222. In other implementations, each image within the set of two dimensional images 222 may initially be assigned to a certain category based on the viewing angle of the face within the image, and then the depth map of each image may be compared against the depth maps of other images that are assigned the same category. For example, if the set of two dimensional images 222 includes left view images, right view images, and front view images, then the matching procedure may be performed such that the depth map of a left view image is only compared to other depth maps of left view images.

At the end of the matching procedure, the locations of matching elements may be used to merge multiple two dimensional images and generate the three dimensional composite image 232. For instance, structural features surrounding the locations of the matching elements may be used to determine geometric relationship between corresponding features within between two images. For example, given the coordinate of a matching element within two images, the structural features surrounding the coordinate of the matching element within each respective image may be compared to determine a transform between the two images. For instance, the transform may indicate a horizontal offset, a vertical offset, and an angular rotation between corresponding structures between two images. This process may be repeated with all the images within the set of two dimensional images 222 to generate the three dimensional composite image 232. The generated three dimensional composite 232 may represent a reconstruction of the set of two dimensional images 222 using one or more transforms between corresponding structures of matching elements within individual images within the set of two dimensional images 222.

In some implementations, the precision and accuracy of the generated three dimensional composite image 232 may adapted based on adjusting the parameters of the three dimensional triangulation procedure as described above. For example, the number of images within the set of two dimensional images 222 may be increased to improve the transition between different viewing angles of a user face. In another example, the resolution of the depth maps for each image may also be increased to represent greater spatial information within each image. In yet another example, the matching procedure between multiple depth maps may be recursively performed to identify a larger number of matching elements between two or more images.

In some implementations, the parameters used for the three dimensional triangulation procedure may be dynamically selected by the digital identifications server 110 based on the quality of images taken by the user. For example, the digital identification server 110 may select parameters for high quality two dimensional images such that a high quality three dimensional composite may be generated for the digital identification 132, whereas the digital identification server 110 may select different parameters for low quality images such that a low quality three dimensional composite may be generated for the digital identification 132. In other implementations, the digital identification server 110 may select different parameters for the three dimensional triangulation process based on the type of identification of the digital identification 132. For example, for digital identifications that require high precision verification (e.g., identifications associated with national security), the digital identification server 110 may select parameters to generate a more accurate three dimensional composite, whereas for digital identifications that do not require high precision verification (e.g., student identification), the digital identification server 110 may select parameters to generate a less accurate dimensional composite.

In some implementations, the digital identification server 110 may perform the three dimensional triangulation process based on the type of the user device 130 that renders and displays the three dimensional composite image 232 on the digital identification 132. For example, if the user device 130 is a computing device with limited graphical capabilities, the digital identification server 110 may generate a streamlined three dimensional composite image 232 that requires limited graphical capabilities from the user device 130 to render the three dimensional composite image 232 on the digital identification 132. Alternatively, the digital identification server 110 may perform different three dimensional triangulation processes based on the type of user device 130 (e.g., smartphone, laptop, etc.).

In some implementations, after performing the three dimensional composite image 232, the digital identification server 110 may perform a set of post-processing operations to adjust the rendering of the three dimensional composite image 232. For example, in some instances, the digital identification server 110 may apply a set of specialized textures to the three dimensional composite image 232 to improve the rendering of the three dimensional composite image 232 within the digital identification 132 to display facial structures with greater accuracy. In other instances, the digital identification server 110 may superimpose additional images of the user onto the three dimensional composite image 232. In other instances, the digital identification server 110 may adjust the color saturation of the three dimensional composite image 232 based on applying the color palate of the originally captured two dimensional images of the user onto the three dimensional composite image 232.

As depicted, the rendering three dimensional composite image 232 may be adjusted based on tilt motions provided by a user on the user device 130. For instance, as shown, renderings 214a and 214b of the digital identification 132 may be shown in response to tilt motions 212a and 21, respectively.

The user device 130 may use a rendering configuration to adjust the display of the three dimensional composite image 232 in response to tilt motions of the user device 130. For instance, the rendering configuration may specify directions to rotate the rendering of the user face (e.g., left, right, up, down) within the three dimensional composite image 232 responsive to a tilt magnitude detected by a gyroscope of the user device 130. In such implementations, the three dimensional composite image 232 is periodically updated based on successive tilt motions provided on the user device 130.

In some implementations, instead of being a three dimensional reconstruction of the set of two dimensional images 222, the three dimensional composite image 232 may alternative include a library of individual images that include different rotational views of the user face. In such implementations, the rendering configuration may specify particular images from the library of individual images to be displayed on the digital identification 132 in response to specified tilt angles of the user device 130. For instance, instead of updating the rendering of the three dimensional composite image 232, in these implementations, user device 130 may instead select a particular two dimensional image to display on the digital identification 132.

Figure 2B:
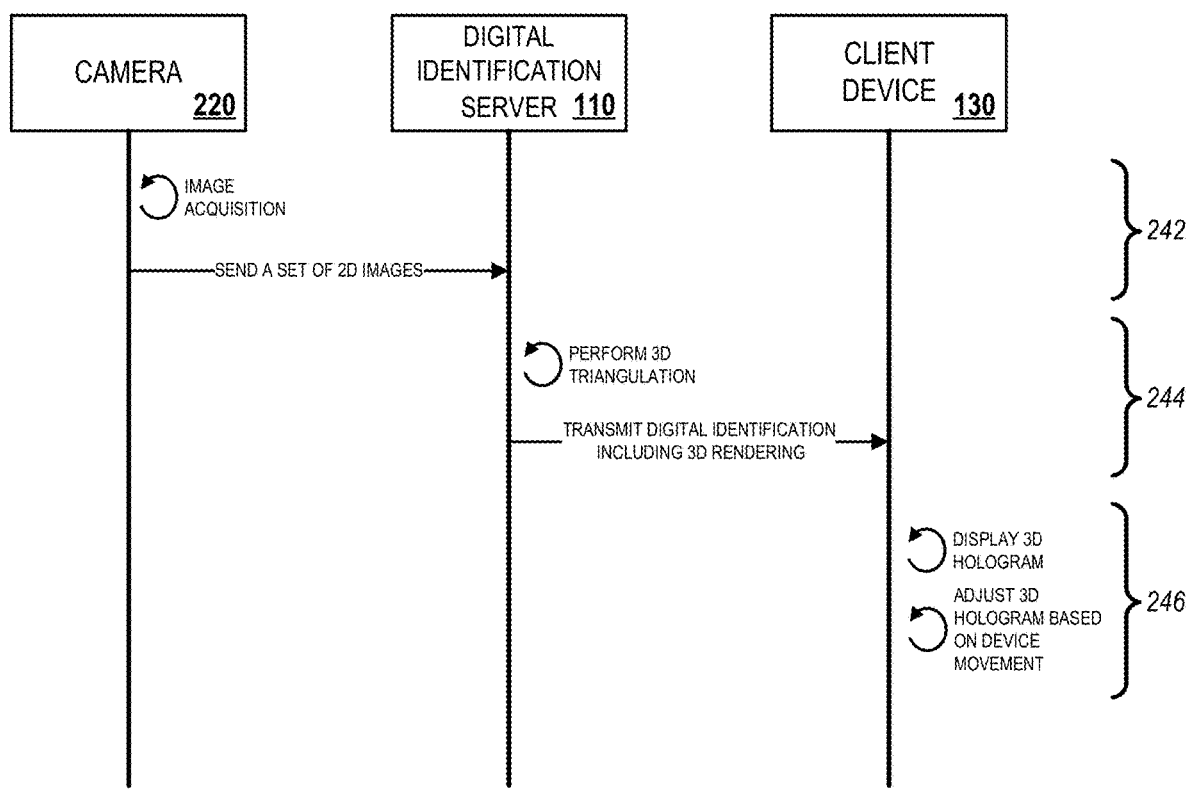
FIG. 2B illustrates an interaction diagram between camera, a digital identification server, and a user device during an example three dimensional composite image generation process.

FIG. 2B illustrates an interaction diagram 2000 between a camera 220, a digital identification server 230 and a user device 210 during an example three dimensional composite image generation process. Briefly, the interaction between the camera 220, the digital identification server 230, and the user device 210 may include acquiring a set of two dimensional images of the user (242), performing a three dimensional triangulation operation to generate a three dimensional composite image (244), and rendering the three dimensional composite image on the digital identification 132 (246).

In more detail, the camera 220 may initially acquire a set of two dimensional images of the user (242). For instance, as described previously with respect to FIG. 2A, the set of two dimensional images 222 may include a plurality of portraits of the user from different viewing angles (e.g., left view, right view, and/or front view). Although FIG. 2A illustrates the camera 220 as a separate component from the user device 210, in some implementations, the camera 220 may be the camera of the user device 130 (e.g., a front-facing camera of a smartphone). In such implementations, image acquisition may be performed by a mobile application on the user device 130 that is configured to operate the camera of the user device 130 to acquire images of the user. After acquiring the set of two dimensional images, the camera 220 may transmit the set of two dimensional images 222 to the digital identification server 110.

In some implementations, instead of including a plurality of portraits of the user from different viewing angles, the set of two dimensional images 222 may be instead be estimated from a single initial two dimensional portrait of the user. In such implementations, one or more features may be extracted from the single two dimensional portrait in order to estimate a set of multiple views of the face of the user from different viewing angles. For example, portions of the single two dimensional portrait may be used to create respective views of the face of the user from different views (e.g., left view, right view, etc.). Depths of portions of the user's face may be estimated from the single image and be used to generate a three dimensional model face of the user. In this regard, instead of receiving multiple two dimensional images, the camera 220 may instead generate the set of two dimensional images 222 from a single two dimensional image based on the features included within the single two dimensional image.

After receiving the set of two dimensional images 222, the digital identification server 110 may perform a three dimensional triangulation operation on the set of two dimensional images 222 to generate the three dimensional composite image 232 (244). For instance, as described previously with respect to FIG. 2A, the digital identification server 110 may initially calibrate individual images within the set of two dimensional images 222, extract depth information for each image, and generate depth maps for each image using the extracted depth information. In addition, the digital identification server 110 may compare the depth maps of each image to identify matching elements between multiple images, and use the locations of the matching elements to determine a transform between multiple images. The digital identification server 110 may use the transform to generate a three dimensional reconstruction of structural features within the set of two dimensional images 222, which may be iteratively executed for multiple matching elements to generate the three dimensional composite image 232. After generating the three dimensional composite image 232, the digital identification server 110 may transmit the three dimensional composite image 232 to the user device.

The user device 130 may receive the generated three dimensional composite image 232 and render the three dimensional composite image 232 for display on the digital identification 132. For instance, as described previously with respect to FIG. 2A, in some implementations, the rendering of the three dimensional composite images may be adjusted based on tilt motions provided by a user. For example, a left view angle of the user face within the three dimensional composite image 232 may be shown in digital identification 132 in response to the left side of user device 130 tilted towards downwards, and vice versa for the right view angle of the user face within the three dimensional composite image 232. In other implementations, instead of adjusting the rendering of the three dimensional composite image 232, the user device may instead select a particular image within a library of images to display on the digital identification 132 in response to a tilt motion. For example, an image with a left view angle of the user face may be shown on digital identification 132 in response to the left side of user device 130 tilted towards downwards, and vice versa for the right view angle of the user face within the three dimensional composite image 232.

Figure 2C:
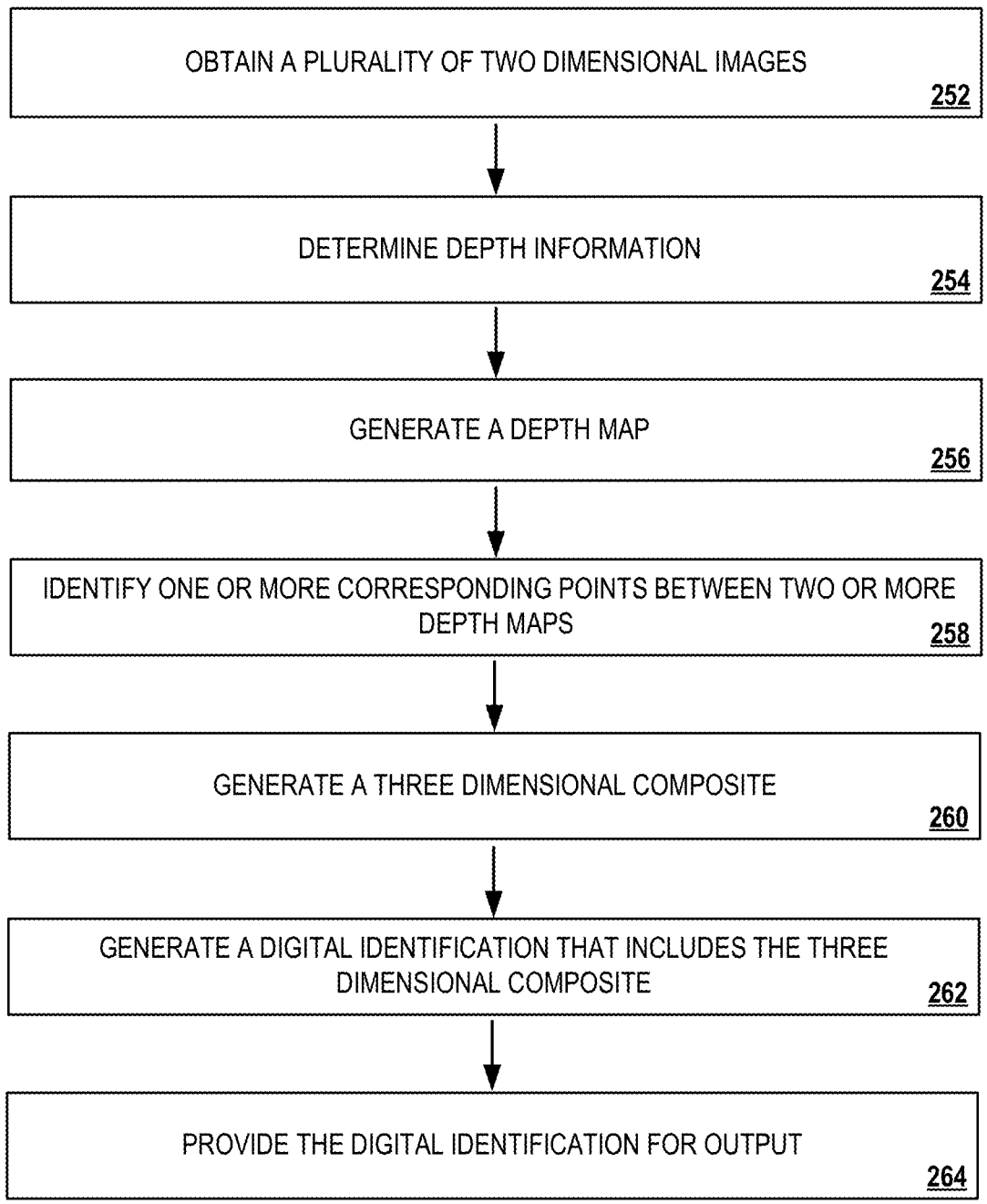
FIG. 2C illustrates a flowchart of an example process for generating a three dimensional composite image within a digital identification.

FIG. 2C is a flowchart of an example process 2000 for generating a three dimensional composite image within a digital identification. Briefly, the process 2000 may include obtaining a plurality of two dimensional images (252), determining depth information (254), generating a depth map (256), identifying one or more corresponding points between two or more depth maps (258), generating a three dimensional composite (260), generating a digital identification that include the three dimensional composite (262), and providing the digital identification for output (264).

In more detail, the process 2000 may include obtaining a plurality of two dimensional images (252). For instance, the digital identification server 110 may obtain, from the camera 220, a plurality of two dimensional images 222 that include a face of a user.

The process 2000 may include determining depth information (254). For instance, the digital identification server 110 may determine depth information for each of the plurality of two dimensional images 222 that include the face of the user.

The process 2000 may include generating a depth map (256). For instance, the digital identification server 110 may generate a depth map for each of the plurality of two dimensional images that include the face of the user based at least on the depth information determined for each of the plurality of two dimensional images 222 that include the face of the user.

The process 2000 may include identifying one or more corresponding points between two or more depth maps (258). For instance, the digital identification server 110 may identify one or more corresponding points between two or more depth maps, where each of the one or more corresponding points may indicate respective positions of a matching element within the two or more depth maps.

The process 2000 may include generating a three dimensional composite (260). For instance, the digital identification server 110 may generate the three dimensional composite image 232 for the face of the user based at least on the identified one or more corresponding points within the two or more depth maps, where the three dimensional composite image 232 includes at least two rotational views of the face of the user as depicted in views 214a and 214b of the digital identification 132 in FIG. 2A.

The process 2000 may include generating a digital identification that include the three dimensional composite (262). For instance, the digital identification server 110 may generate the digital identification 132 for the user that includes the three dimensional composite image 232 for the face of the user.

Figure 3A:
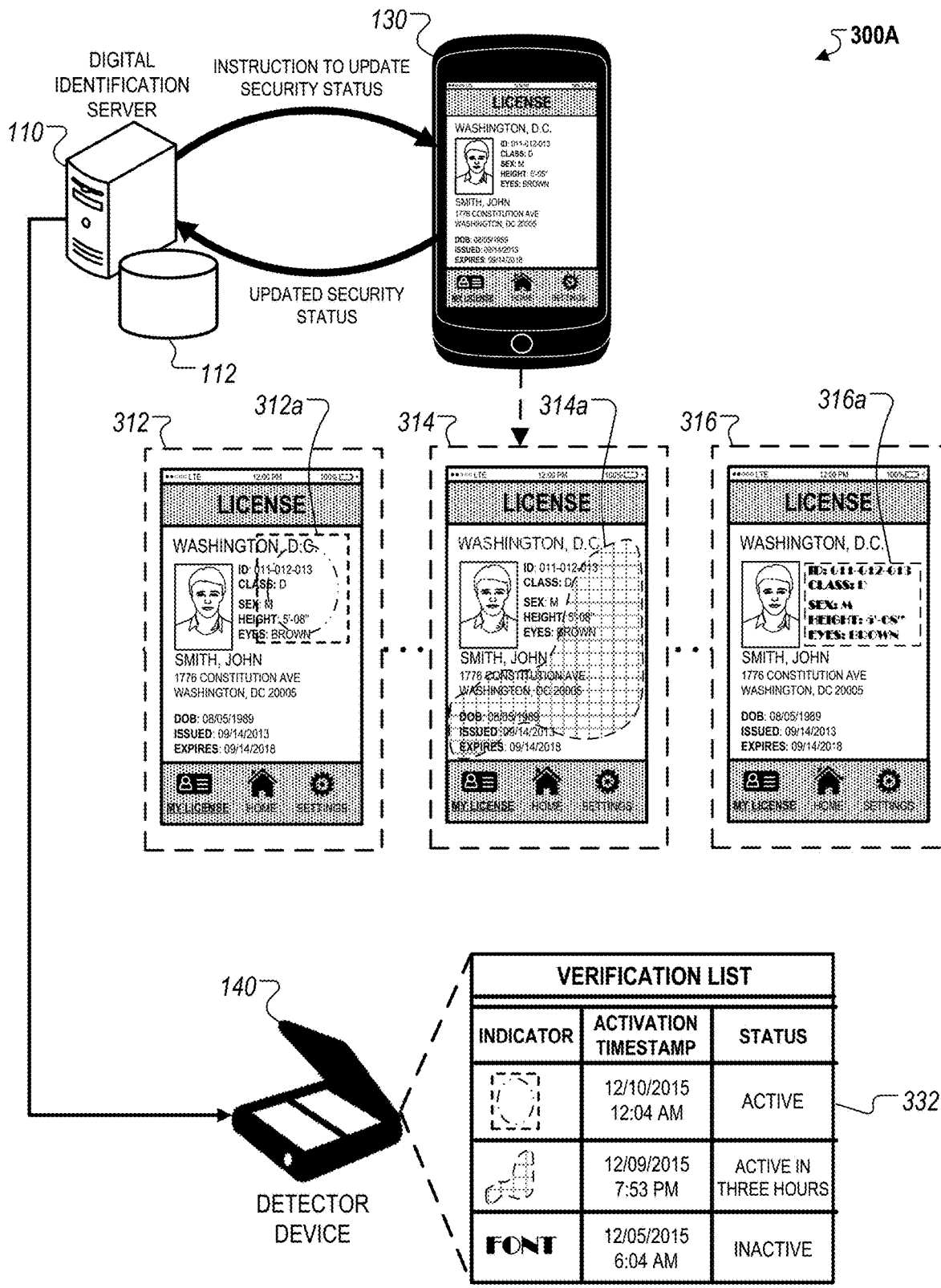
FIG. 3A illustrates a block diagram of an example system using variable visual indicators that may be displayed in a digital identification.

The process 2000 may include providing the digital identification for output (264). For instance, the digital identification server 110 may provide the digital identification 132 to the user device 130. FIG. 3A illustrates example visual indicators 312a-216a that may be displayed on the digital identification 132. Briefly, the user device 130 may exchange communications with the digital identification server 110 and generate a set of digital identifications 312-316, which may include visual indicators 312a-316a, respectively. In some instances, the digital identification server 110 may additionally transmit instructions to the detector device 140 that include a verification list 332 which may allow the detector device 140 to detect the visual indicators 312a-316a or notify a user of the detector device 140 what visual indicator to expect on the digital identification 132.

The digital identifications 312-316 may represent different renderings of the digital identification 132 on the user device 130 based on the security status assigned to the digital identification 132 by the digital identification server 110. For instance, as described in FIG. 1B, the security status may include an instruction to display a particular visual indicator on the digital identification 132 based on various conditions. In one example, the security status may associate a particular visual indicator to be displayed on the digital identification 132 based on a time (e.g., one visual indicator for the morning, and another visual indicator for the night). In another example, the security status may associate a particular visual indicator to be displayed on the digital identification 132 based on the type of identification of the digital identification 132 (e.g., one visual indicator for a digital driver license, and another visual indicator for a social security card). In this regard, the visual indicators may be used to easily identify a dynamic security status that is currently associated with the digital identification 132.

In some implementations, the digital identification server 110 may assign a particular security status to the digital identification 132 to display a particular visual indicator based on the user information included in the digital identification 132. For instance, the digital identification server 110 may assign a particular security status including a specific visual indicator based on the presence of certain information within the digital identification 132. In one example, if user information within the digital identification 132 indicates that the digital identification 132 may be used for a high security applications (e.g., an identification related to national security), the digital identification server 110 may assign a particular security status that specifies a particular visual indicator with a complex graphical pattern that is difficult to replicate. In another example, if the user information within the digital identification 132 indicates that the user has previously had security issues with other types of digital identifications, the digital identification server 110 may similarly assign a security status with a complex graphical pattern to protect susceptible users from subsequent security breaches. In this regard, the visible indicators displayed within the digital identification 132 may be configurable based on the user information included in the digital identification, enabling the ability to dynamically adjust how the digital identification 132 is displayed to protect against security breaches that particularly impact certain types of user information.

The visual indicators 312a-316a may represent different types of visual indicators that may be displayed on the digital identification 132. For instance, the visual indicator 312a may be a floating overlay graphic, the visual indicator 314a may be a virtual backdrop graphic, and the visual indicator 316a may be a font alteration graphic.

The visual indicator 312a may be a floating overlay graphic that is part of a set of transparent layers displayed on the digital identification 132. For instance, the visual indicator 312 may include one or more patterns that are combined in multiple layers to generate a simulation graphic that is uniquely identifiable within the digital identification 132. For example, as shown in FIG. 3A, the visual indicator 312a includes an oval graphic that is superimposed on a rectangular graphic. In this example, the oval and the rectangular graphics represent different transparent layers that are combined to generate a uniquely identifiable pattern.

In some implementations, the specific uniquely identifiable pattern represented by the visual indicator 312a may be adjusted by the digital identification server 110 using a time-based schedule. In such implementations, the digital identification server 110 may store different security statuses 322 that each include different permutations of the visual indicator 312a (e.g., different graphics, different number of transparent layers, etc.), and may assign different security statuses 322 to the digital identification 132 based on the time-based schedule such that the various permutations of the visual indicators 312a based on the time. In this regard, the particular floating overlay graphic that is displayed on the digital identification 132 may be variably selected based on the assignment of different security statuses 322.

The visual indicator 312a may be displayed on various regions of the digital identification 132. For instance, as shown in the example in FIG. 1A, the visual indicator 312a may be displayed in a specific region that includes highly important user information (e.g., ID number, ID classification) to direct a user's attention to such user information for verification. Alternatively, the visual indicator 312a may be displayed on other regions of the digital identification 132. In some implementations, in addition to the security status specifying a particular visual indicator to display on the digital identification 132, the security status may include a spatial coordinate to place the particular visual indicator such that the placement of the visual indicator may also be variably specified by the security status.

The visual indicator 314b may be a virtual backdrop that is displayed or rendered within the background of the digital identification 132 such that user information overlaying the visual indicator 314b may still be visible. For instance, the visual indicator 314b may be a static image that includes a single graphical representation, a dynamic image that cycles through a set of graphical representations that cycle through individual graphical representations over a particular period of time (e.g., every three seconds), or a looped video clip that repeatedly plays a time-lapse representation (e.g., a looped three second video). In each of these instances, the visual indicator 314a may be used to customize the overall appearance of the digital identification 132 based on the security status assigned by the digital identification server 110.

In some implementations, the visual indicator 312a and 314a may include issuer-specific graphical representations to be displayed on the digital identification 132. For instance, the graphical representations may include specific logos, images, or video clips that identify the issuing authority such that an authorized user that visually verifies the digital identification 132 may more easily identify the issuing authority associated with the digital identification 132.

The visual indicator 316a may be a deliberate character alteration that adjusts the display of characters shown on the digital identification 132. For instance, as depicted in FIG. 3A, in some instances, the font of specific characters may be deliberately adjusted based on an anticipated verification operation to be performed on the digital identification (e.g., verification of the user's date of birth), or based on a pattern that is used indicate whether the digital identification 132 is authentic. For instance, the assigned security status may specify which particular characters are to be altered, and the method of alteration such that the digital identification server 110 may variably adjust different characters shown on the digital identification 132 based on a particular assigned security status.

In some implementations, the visual indicator 316a may be shown on the digital identification 132 as a result of the digital identification 132 determining that the digital identification 132 is fraudulent. In such implementations, the digital identification server 110 may include a particular security status that specifies the visual indicator 316a and is assigned to the digital identification 132 that is determined to be fraudulent. In this regard, the visual indicator 316a may be used to provide an indication to an authorized user that verifies the digital identification 132 that the digital identification 132 may be fraudulent.

In some implementations, in addition to displaying the visual indicators 312a-316a, the digital identification 132 may include a set of swipe through histories that indicate changes to the user information presented on the digital identification 132. For instance, the swipe through histories may include information related to address changes, state of residency changes, user portrait changes, or other types of personally identifiable information of the user associated with the digital identification 132. In some implementation, the historical information may be used to determine whether the digital identification 132 is authentic and has been issued by the issuing authority. For instance, the swipe through histories may be compared against a system of record on the issuing authority server to determine whether the historical information is either incorrect, or missing certain key issuance milestones, which may indicate that the digital identification 132 is potentially invalid.

In some implementations, the visual indicators 312a-316a may be used to implement the level one security protocols 142 for visible verification of the digital identification 132 as described previously in FIG. 1B. For instance, the visual indicators 312a-316a may be uniquely generated patterns that are used to verify whether the digital identification 132 includes a fraudulent visual indicator, which represent that the digital identification 132 may have been altered by an unauthorized user. In such implementations, the visual indicators 312a-316a may be available in full spectrum holographic designs or clear non-holographic protective patterns. For instance, the full spectrum holographic patterns may be used to view information from specific layers of the visual indicators 312a-316a in certain viewing angles to verify the authenticity of the visual indicators 312a-316a.

In addition to periodically updating and assigning the security status to the digital identification 132 to update the visual indicator displayed on the digital identification 132, the digital identification server 110 may also generate the verification list 332. The verification list 332 may include a list of visual indicators that are either presently displayed, previously displayed, or will be displayed on the digital identification 132. For instance, as shown in FIG. 3A, the verification list may include the graphical representation of each visual indicator, an activation timestamp, or a status associated with each visual indicator.

The verification list 332 may be updated and generated each time the security status is updated and assigned to digital identification 132 such that an authorized user may use the verification list 332 to determine whether a particular visual indicator that is displayed on the digital identification matches the corresponding visual indicator for the security status currently assigned to the digital identification 132. In this regard, the verification list 332 may be used to visibly detect incorrect or fraudulent digital identifications based on matching a displayed visual indicator to an expected visual indicator specified by the verification list. For example, in some instances, the verification list 332 may be utilized by law enforcement personnel of an issuing authority that has a specified time-schedule for the visual indicators that are displayed on the digital identification 132 of enrolled users. In such instances, the verification list may be provided to the detector device 140 of the law enforcement personnel to indicate recent security status changes.

In some implementations, the visual indicators 312a-316a may additionally or alternatively include ultraviolet light-activated holograms that generate a UV-activated imprint that is detectable by detection devices such as, for example, the detector device 140.

Figure 3B:
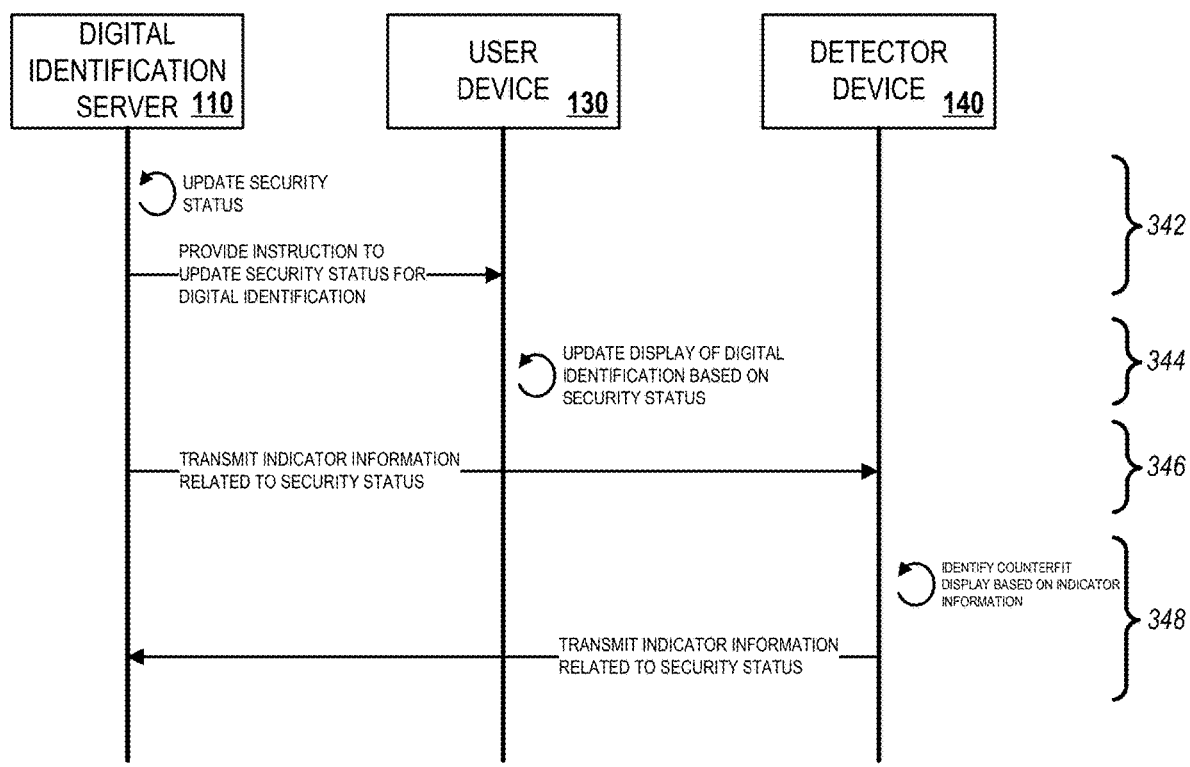
FIG. 3B illustrates an interaction diagram between a digital identification server, a user device, and a detector device during an example visual indicator generation process.

FIG. 3B illustrates an interaction diagram 300B between the digital identification server 110, the user device 130, and the detector device 140 during an example visual indicator generation process. Briefly, the digital identification server 110 may update the security status of the digital identification 132 and provide an instruction to the user device 130 assigning the updated security status (342), the user device 130 may update the display of the digital identification 132 based on the received instruction from the digital identification server 110 (344), the digital identification server 110 may transmit visual indicator information related to the assigned security status to the detector device 140 (346), and the detector device 140 may provide indicator information to an authorized user (348).

In more detail, the digital identification server 110 may update the security status of the digital identification 132 and provide an instruction to the user device 130 assigning the updated security status (342). For instance, as described previously, the digital identification server 110 may update the security status of the digital identification 132 such that the display of the digital identification 132 is updated to show a visual indicator that is specified by the updated security status. In some implementations, the security status may be updated based on a specified time-based schedule that periodically updates the security status. Alternatively, in other implementations, the security status may be updated based on milestone events (e.g., user updating account information), or based on the specific type of user information included within the digital identification 132.

The user device 130 may update the display of the digital identification 132 based on the received instruction from the digital identification server (344). For instance, as described previously, the user device 130 may update the rendering of digital identification to display an updated visible indicator that is specified by the updated security status assigned by the digital identification server. For example, the instruction to update the security status for the digital identification 132 from the digital identification server 110 may include a reference to a particular visual indicator, and in response to receiving the instruction, the user device may select the particular visual indicator from a list of locally stored visual indicators and update the rendering of the digital identification 132 to show the particular visual indicator on the digital identification 132.

The digital identification server may transmit visual indicator information related to the assigned security status to the detector device 140 (346). For instance, as described previously, the digital identification server 110 may transmit the verification list 332 including a list of previous, current, and future visual indicators to be displayed on the digital identification 132 and an associated status to enable an authorized user to verify the visual indicator that is displayed on the digital identification 132. In some instances, the detector device 140 may be a client device that is available to the authorized user (e.g., a government-issued laptop, phone, or tablet) that is configured to receive security information from the digital identification server 110. In other instances, the detector device 140 may be a computing device of a security terminal of a issuing authority that is used to relay updated security information to personnel of the issuing authority that regularly verify the authenticity of digital identification 132 (e.g., transportation security agency personnel).

The detector device 140 may provide indicator information to an authorized user (348). For instance, as described previously, an authorized user may use the verification list 332 to identify an expected visual indicator that should be presently shown on the digital identification 132. If the visual indicator that is presently displayed on the digital identification 132 matches the expected visual indicator indicated by the verification list 332 that was transmitted to the detector device 140, then the authorized user may determine that the digital identification 132 is valid.

Alternatively, if the visual indicator that presently displayed on the digital identification 132 does not match the expected visual indicator indicated by the verification list 332, then the authorized user may determine that the digital identification 132 may be potentially fraudulent. In such instances, the authorized user may use the detector device 140 to transmit a notification of a potential fraudulent digital identification 132 to the digital identification server 110, or perform additional verification procedures such as, for example, using the level two security protocols 144 or the level three security protocols 146.

Figure 3C:
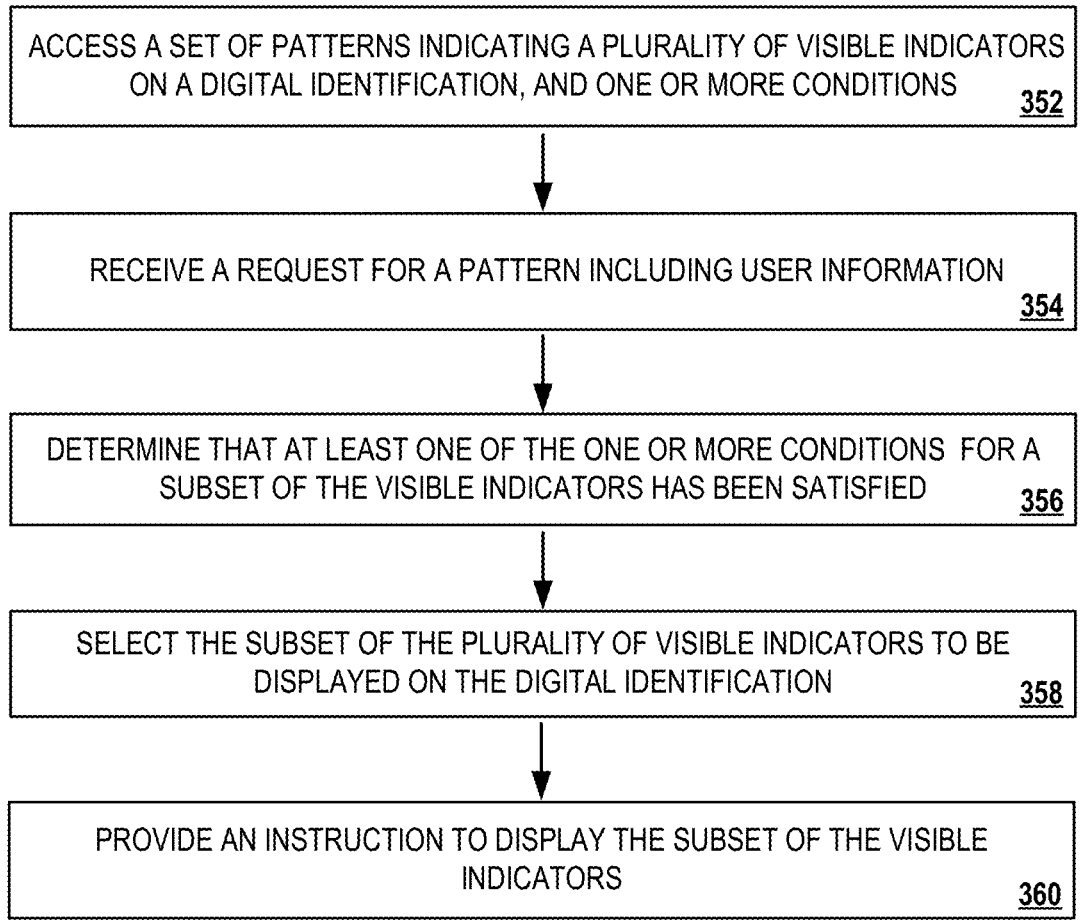
FIG. 3C illustrates a flowchart of an example process for generating visible indicators displayed on a digital identification.

FIG. 3C illustrates a flowchart of an example process 3000 for generating the visual indicators 312a-316a displayed on the digital identification 132. Briefly, the process 3000 may include accessing a set of patterns indicating a plurality of visible indicators on a digital identification, and one or more conditions (352), receiving a request for a pattern including user information (354), determining that at least one of the one or more conditions for a subset of the visible indicators has been satisfied (356), selecting the subset of the plurality of visible indicators to be displayed on the digital identification (358), and providing an instruction to display the subset of the visible indicators (360).

In more detail, the process 3000 may include accessing a set of patterns indicating a plurality of visible indicators on a digital identification, and one or more conditions (352). For instance, the digital identification server 110 may access a set of patterns that indicate a plurality of visible indicators 312a-316a, as depicted in FIG. 3B, to be displayed on the digital identification 132 for the user device 130. The set of patterns also indicate, for each of the plurality of visible indicators 312a-316a, one or more conditions that, when satisfied, cause the plurality of visible indicators 312a-316a to be displayed on the digital identification 132.

The process 3000 may include receiving a request for a pattern including user information (354). For instance, the digital identification server 110 may receive, from the user device 130, a request for a visual indicator including user information associated with the user device 130.

The process 3000 may include determining that at least one of the one or more conditions for a subset of the visible indicators has been satisfied (356). For instance, the digital identification server 110 may determine, based at least on the user information included in the received request, that at least one of the one or more conditions for a subset of the plurality of visible indicators 312a-316a has been satisfied.

The process 3000 may include selecting the subset of the plurality of visible indicators to be displayed on the digital identification (358). For instance, in response to determining that at least one of the one or more conditions for a subset of the one or more visible indicators 312a-316a has been satisfied, the digital identification server 110 may select the subset of the plurality of visible indicators 312a-316a to be displayed on the digital identification 132.

The process 3000 may include providing an instruction to display the subset of the visible indicators (360). For instance, the digital identification server 110 may provide, to the user device 130, an instruction to display the subset of the plurality of visible indicators 312a-316a on the digital identification 132.

Figure 4A:
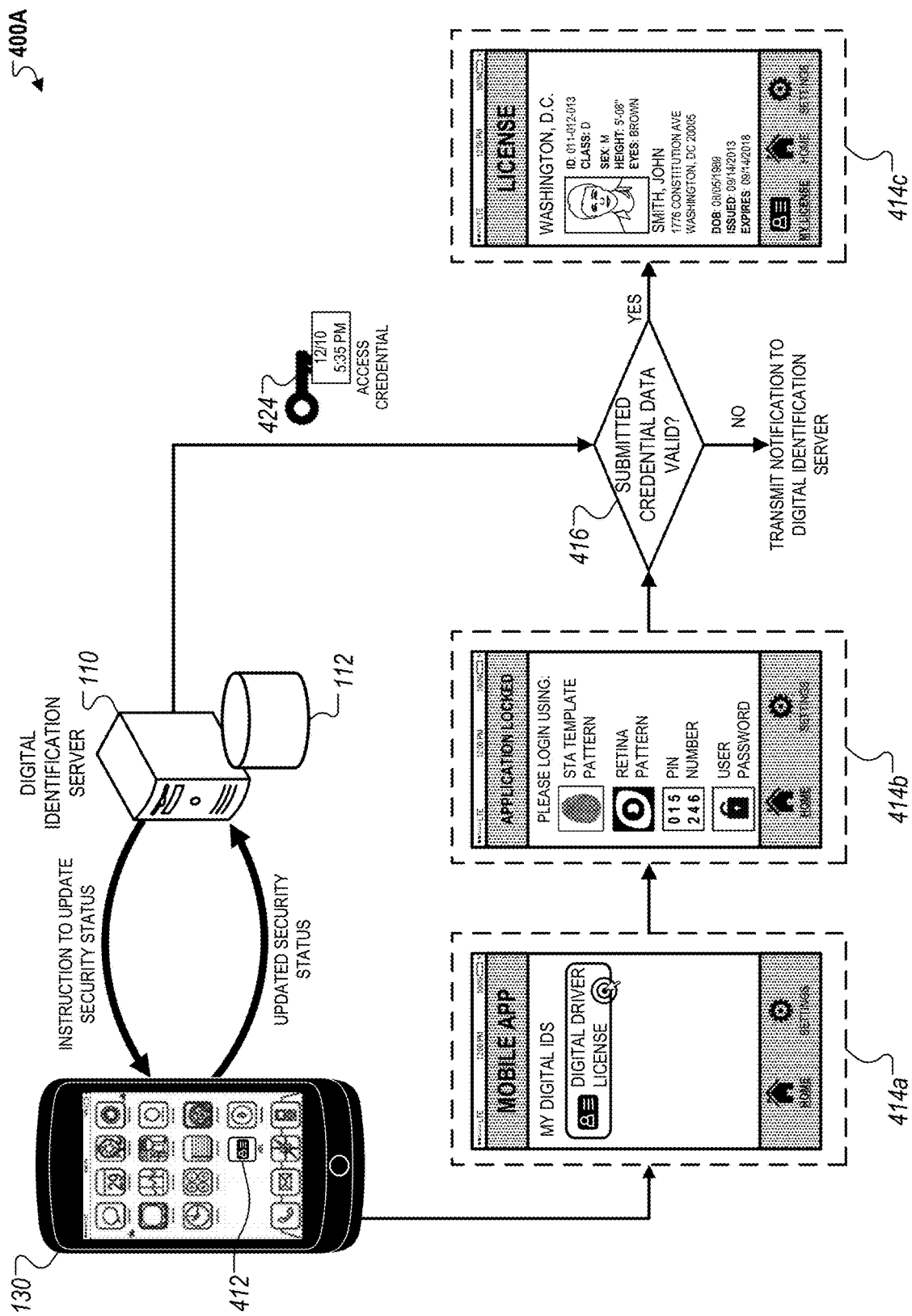
FIG. 4A illustrates a block diagram of an example system for protecting access to secure user information displayed on a digital identification

FIG. 4A illustrates a block diagram of a system 400A for protecting access to secure user information displayed on the digital identification 132. Briefly, the user device 130 may receive a user input from a user that enables an icon 412 and in response, the user device 130 may display a digital identification application screen 414a on the user device 130. An access screen 414b may then be presented to request user credential data to provide access to secure user information. The user-submitted user credential data may be determined to be valid at decision point 416 based on an access credential 424 provided by the digital identification server 110. In response to determining that the submitted user credential data matches expected credential data, a secure screen 414c including secure user information may be displayed on the user device 130.

As described previously, the security status assigned to the digital identification 132 by the digital identification server 110 may specify user credential data to be included in the digital identification 132. In some instances, the security status may additionally designate a portion of the user information as low security user information, and a portion of the user information as secure user information. For instance, as described previously, the secure user information may be information that the user may consider private information. For example shown in FIG. 1A, the security status may designate the license ID, the name, address, and the date of birth secure user information, and the user sex, height, and eye color as low security information.

The secure user information within the digital identification 132 may be encrypted by the digital identification server 110 using the access credential 424. The access credential 424 may be a variable private key that is periodically updated by the security status, and assigned to the user to enable access to secure user information displayed within the digital identification 132. For instance, the access credential 424 may be updated each time the digital identification server 110 updates the security status of the digital identification 132, which includes a timestamp associated with newly assigned security status (e.g., December tenth at 5:30 PM in FIG. 4A).

In other instances, the token credential may include other types of user credential data such as, for example, a registered fingerprint of the user, a retina pattern of the user, a user-selected personal identification number (PIN), or a user specified password. In such instances, whenever the security status is updated for the digital identification 132, the user may receive a notification to specify updated credential data that may be subsequently used as the access credential 424 for the updated security status. In this regard, the security status may specify a different set of user credential data to prevent security risks imposed by static credentials that are often used to provide access to secure user information.

In some implementations, the user device 130 may include a mobile application that is used to provide access to the digital identification 132. For instance, as shown in FIG.

4A, a user may initially provide a user input over the icon 412, which may launch the mobile application on the user device and display the screen 414a on the user device 130. The screen 414a may include a list of digital identifications associated with the user. In some implementations, the screen 414a may include multiple digital identifications that are each associated with a different issuing authority (e.g., a digital driver license issued by the department of motor vehicles, and a social security card issued by the social security administration).

The user may then provide a user input selecting a particular digital identification on the screen 414a and then be redirected to the access screen 414b. The access screen 414b may be a lock screen that requests the user to submit user credential data in order to provide access to encrypted secure user information included in the digital identification 132. For instance, the submitted user credential data may include biometric identifiers of the user (e.g., a registered fingerprint or a retinal pattern), or a user-selected access credential (e.g., a user-specified PIN code, or a user password). The user may then provide a user input including user credential data.

In some implementations, the access screen 414b may be configured to accept other types of user input. For example, the access screen 414b may include a skin texture analysis (STA) module where a user may place appendages (e.g., fingers) on the screen of the user device 130. For example, the STA may include analyzing features such as skin patterns. In other implementations, the screen 414a may be configured to perform facial recognition of a captured image submitted by the user.

The access screen 414b may be used to protect access to secure user information included in the digital identification 132. For example, by requiring user credential data that is associated with biometric identifiers of the user, the access screen 414b may enable protection against unauthorized access to secure user information in circumstances where the user may have lost the user device 130. In such examples, if the user device 130 receives a simulated credential (e.g., a falsified STA template), the user device 130 may transmit an indication to the digital identification server 110, and verification techniques using additional user credential data may be used as a secondary authentication process to provide access to the secure user information.

After receiving the user input including the user credential data, the user device 130 may then verify the user credential data against the most recent access credential 424 provided by the digital identification server 110 during the most recent security status update. For instance, in some instances, the access credential 424 may include a set of features that are compared against the received user credential data in order to determine whether the user-submitted credential data is valid. If the user-submitted user credential data does not match the feature templates included within the access credential 424, the user device 130 may determine that the user has provided invalid user credential data, and a notification indicating the failed attempt may be transmitted to the digital identification server 110. If the user-submitted user credential data matches the feature templates included in the access credential 424, the user device 130 may determine that the user has provided valid user credential data, and in response display the digital identification 132 including secure user information.

In some implementations, if greater than a threshold number of failed attempted have been made, the user device 130 may transmit a notification indicating the number of failed attempts to the digital identification server 110 and in response, the digital identification server 110 may dynamically update the security status of the digital identification 132 to prevent further access attempts using the submitted credential data, and to further secure the user information included in the digital identification 132. In other implementations, instead of updating the security status, the digital identification server 110 may instead provide a notification to the user requesting to verify that the individual using the user device to access the secure user information is in fact the user.

In some implementations, instead of restricting access to the entire digital identification 132 using an access screen 414b, as shown in FIG. 4A, the user information may show an adjusted digital identification 132 where the information that is designated as secure user information may be redacted or otherwise not viewable. In such implementations, the digital identification 132 may still be accessed to display low security user information (e.g., user name and phone number), but may require the submission of user credential data to enable access to the secure user information within the digital identification server 110. In this regard, the digital identification 132 may be used in circumstances where the user may use the digital identification 132 as a form of identification without unnecessarily providing secure user information.

In some implementations, instead of the security status designating which portion of the user information is considered secure user information, and other portions of the user information that are considered low security information, the user device 130 may accept user input that designates specific portions of the user information as secure user information. For example, the user may adjust display settings for the digital identification 132 on the user device 130 and indicate user-selected secure user information. In response, the user device 130 may provide a signal to the digital identification server 110 indicating the user-selected secure user information, and in response, the digital identification server 110 may update the security status for the digital identification 132 to designate the user-selected secure user information as the secure user information.

In some implementations, instead of comparing the user-submitted user credential data to the access credential 424 to provide access to the secure user information, the user device 130 may receive a separate authorized credential data, which provides access to the secure user information without comparing to the access credential 424. For instance, the authorized credential data may be submitted by a specific individual that is associated with a law enforcement agency or is otherwise authorized by the issuing authority to access the secure user information with the permission of the user or by the use of a search warrant or probable cause (e.g., a police officer, an investigator, etc.). In such implementations, the security status may additionally specify an authorized access code that is associated with an authorized device associated with the issuing authority.

Figure 4B:
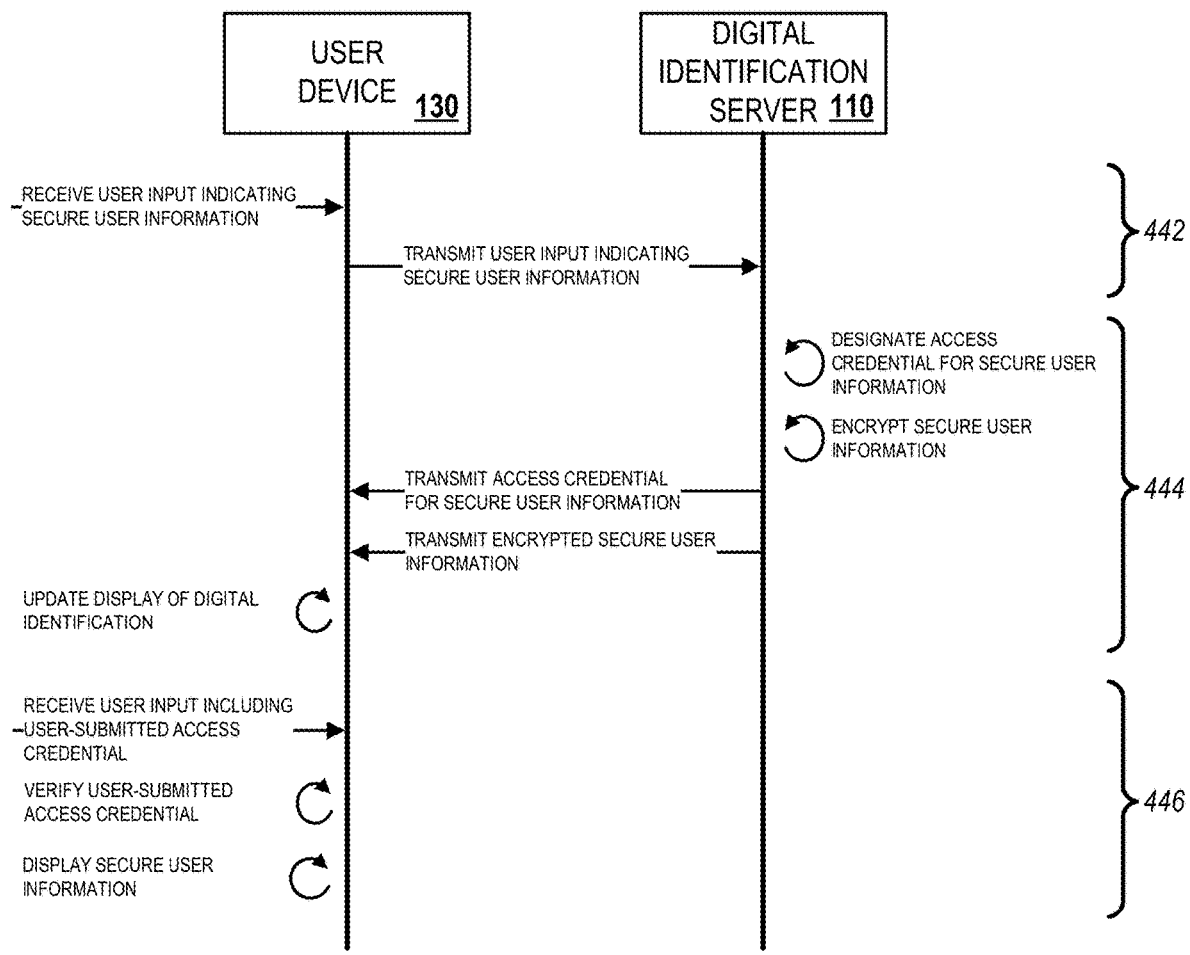
FIG. 4B is an interaction diagram between a digital identification server and a user device during an example process for protecting access to secure user that is displayed on a digital identification.

FIG. 4B illustrates an interaction diagram 400B between the digital identification server 110 and the user device 130 during an example process for protecting access to secure user displayed on the digital identification 132. Briefly, the user device may receive a user input indicating secure user information and transmit the user input to the digital identification server (110), the digital identification server 110 may then generate an access credential for the secure user information, encrypt the secure user information, transmit the access credential for the secure user information and the encrypted secure user information to the user device, and the user device 130 may update the display of the digital identification 132 (444), the user device 130 may receive a user input including a user-submitted access credential, verify the user-submitted access credential, display the secure user information, and transmit results of the verification (446).

In more detail, the user device may receive a user input indicating secure user information and transmit the user input to the digital identification server 110 (442). For instance, as described previously, the user may provide a user input indicating which portion of the user information included in the digital identification 132 is secure user information. For example, the user input may include a selection of particular user information that the user wishes to be considered private and not displayed by default on the digital identification 132. The user device 130 may then transmit the user information within the digital identification 132 to the digital identification server 110, and the user selection of the secure user information.

The digital identification server 110 may then generate an access credential for the secure user information, encrypt the secure user information, transmit the access credential for the secure user information and the encrypted secure user information to the user device, and the user device 130 may update the display of the digital identification 132 (444). For instance, as described previously, the digital identifications server 110 may designate the access credential 424 for the secure user information, and encrypt the secure user information such that access to the secure user information within the digital identification 132 requires a provisioning of the access credential to decrypt the secure user information. The digital identifications server 110 may then transmit the access credential for the secure user information to the user device 130. The user device 130 may then update the display of the digital identification 132 on the user device 130 based on the encrypted secure user information. For example, in some instances, if the digital identification 132 includes significant portions of secure user information, then access to the entire digital identification 132 may be restricted with the use of a lock screen as depicted in FIG. 4A. In other instances, if the digital identification 132 includes a smaller portion of secure user information, the display of the digital identification 132 may be adjusted such that the secure user information may either be redacted or otherwise removed such that the secure user information is not displayed on the digital identification 132.

Although FIG. 4B depicts the digital identification server 110 encrypting the secure user information, in some instances, the user device 130 may instead perform the encryption of the user-selected secure user information. For instance, in such implementations, the security status assigned to the digital identification 132 by the digital identification server 110 may specify a set of encryption protocols to locally encrypt user information within the digital identification 132. For example, the encryption protocol may utilize a private key, that is designated by the assigned security status, to encrypt the user-selected secure user information.

The user device 130 may receive a user input including a user-submitted access credential, verify the user-submitted access credential, display the secure user information, and transmit results of the verification (446). For instance, as described previously, the user device may receive a user input including the user-submitted access credential. For example, as depicted in FIG. 4A, the user-submitted access credential may be received in response to presenting the access screen 414b to the user requesting user credential data. As described previously, the user-submitted access credential may include a biometric identifier associated with the user such as a registered fingerprint, a retina scan, or a user-defined access credential such as a PIN code or an access password.

The user device 130 may verify the authenticity of the user-submitted access credential by comparing the user-submitted access credential to the access credential designated by the digital identification server 110. For example, in some instances where the user-submitted access credential is a biometric identifier, the comparison may include extracting features (e.g., fingerprint minutiae) from the user-submitted access credential and determining if the extracted features match feature templates included within the access credential for the secure user information. In other instances, where the user-submitted access credential is a user-selected code, the value of the user-selected code (e.g., either a numeric or an alphanumeric value) may be compared to reference value that is associated with the user account. If the user device 130 determines that the user-selected access credential matches the access credential 424, then the user device 130 may provide access to the secure user information on the digital identification 132.

Figure 4C:
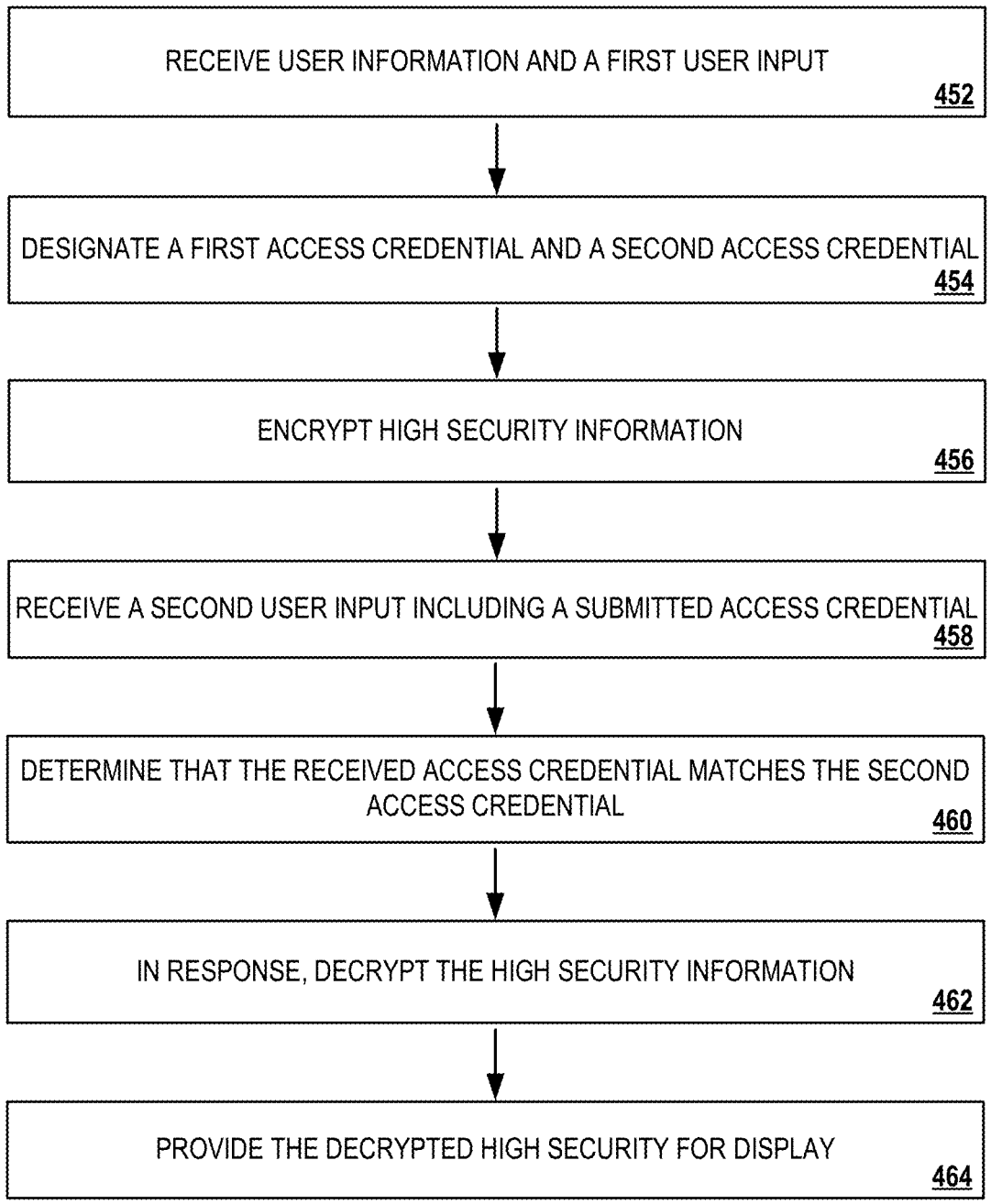
FIG. 4C is a flowchart of an example process for protecting access to secure user that is displayed on a digital identification.

FIG. 4C is a flowchart of an example process 4000 for protecting access to secure user that is displayed on a digital identification. Briefly, the process 4000 may include receiving user information and a first user input (452), designating a first access credential and a second access credential (454), encrypting high security information (456), receiving a second user input including a submitted access credential (458), determine that the received access credential matches the second access credential (460), in response, decrypting the high security information (462), and providing the decrypted high security information for display (464).

In more detail, the exemplary process 4000 may include receiving user information and a first user input (452). For instance, the digital identification server 110 may receive user information from the digital identification 132 on the user device 130, and a first user input indicating low security information within the user information, and high security information within the user information.

The process 4000 may include designating a first access credential and a second access credential (454). For instance, the digital identification server 110 may designate, based at least on the received user information and the received user input, a first access credential for the low security information within the user information, and a second access credential for the high security information.

The process 4000 may include encrypting high security information (456). For instance, the digital identification server 110 may encrypt the high security information within the user information.

The process 4000 may include receiving a second user input including a submitted access credential (458). For instance, the user device 130 may receive a second user input that include an access credential such as, for example, a STA template pattern, a retina pattern, a PIN number, or a user password, as depicted in the access screen 414b in FIG. 4A.

The process 4000 may include determine that the received access credential matches the second access credential (460). For instance, the user device 130 may determine that the received access credential matches the second access credential for the high security information. For example, in some implementations, the user device 130 may initially receive an instruction from the digital identification server 110 that includes the second access credential for the high security information, and the user device 130 may then compare the received access credential from the user and the second access credential for the high security information.

The process 4000 may include decrypting the high security information (462). For instance, the user device 130 may decrypt the encrypted high security information of the digital identification 132.

The process 4000 may include providing the decrypted high security information for display (464). For instance, the user device 130 may provide the decrypted high security information to be displayed on the digital identification 132.

Figure 4D:
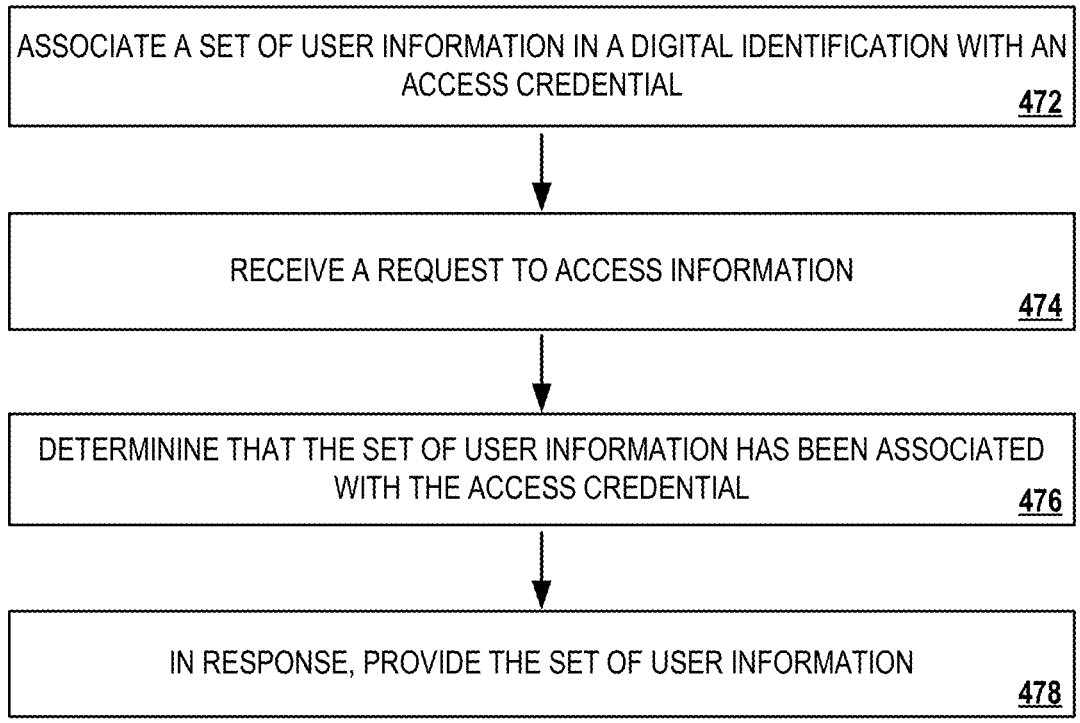
FIG. 4D is a flowchart of an example process for providing access to user information that is displayed on a digital identification.

FIG. 4D is a flowchart of an example process 400D for providing access to user information that is displayed on a digital identification. Briefly, the process 400D may include associating a set of user information in a digital identification with an access credential (472), receiving a request to access information (474), determining that the set of user information has been associated with the access credential (476), and in response, providing the set of user information (478).

In more detail, the process 400D may include associating a set of user information in a digital identification with an access credential (472). For instance, the user device 130 may define that a name and address of the user in the digital identification 132 be shown when a first password is provided to access user information and define that all of the information of the digital identification 132 be when a second, different password is provided to access user information.

The process 400D may include receiving a request to access information (474). For instance, the user device 130 may receive a request to access information from the user where the request includes a first password entered by the user that is associated with showing a name and address of the user in the digital identification 132 or where the request includes a second, different password entered by the user that is associated with showing all user information in the digital identification 132.

The process 400D may include determining that the set of user information has been associated with the access credential (476). For instance, the user device 130 may determine that the name and address has been associated with an access credential that is a first password or determine that all the user information has been associated with an access credential that is a second, different password.

The process 400D may include providing the set of user information (478). For instance, in response to determining that the set of user information has been associated with the access credential 424, the user device 130 may provide the set of user information that has been associated with the access credential for output on a display of the digital identification 132. In another example, the user device 130 may wirelessly transmit the set of user information to another device. Accordingly, the amount and type of user information provided by the digital identification 132 may be controlled based on the access credential provided.

Figure 5A:
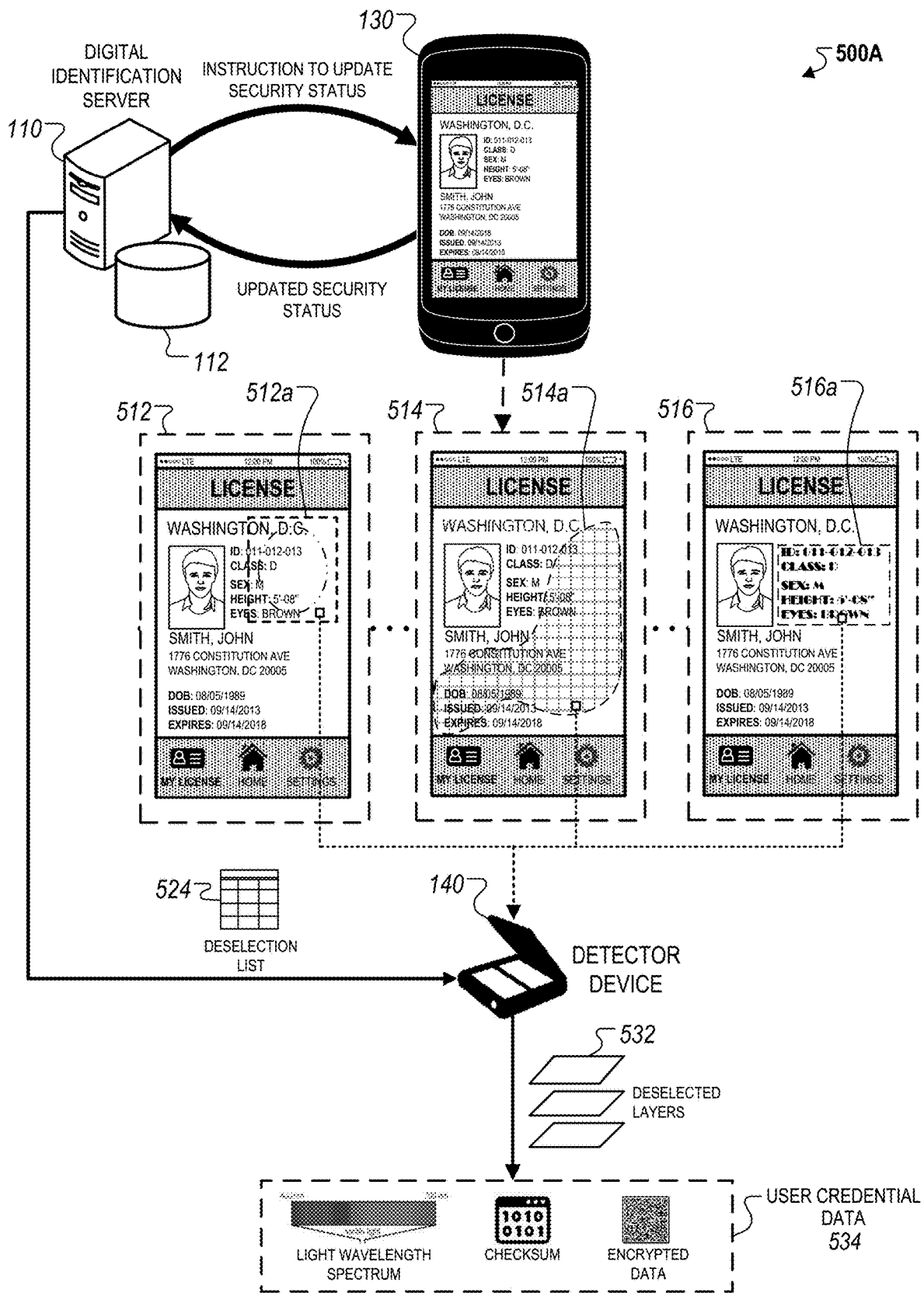
FIG. 5A illustrates a block diagram of an example system using visual indicators with embedded user credential data displayed on a digital identification.

FIG. 5A illustrates a block diagram of an example system 500A using visual indicators 512a-516a that may be displayed on the digital identification 132. Briefly, the user device 130 may exchange communications with the digital identification server 110, and generate a set of digital identifications 512-516, which may include the visual indicators 512a-516a, respectively. The visual indicators 512a-516a may include multiple data layers that are extracted by the detector device 140.

In some instances, the digital identification server 110 may transmit a deselection list 524 to the detector device 140, which may use the deselection list 524 to extract a set of deselected layers 532 that include extracted data from the multi-layered visual indicators 512-516. The deselection list 524 may indicate each of the multiple layers that are included in the visible indicators 512a-516a, and instructions for each layer to deselect an individual layer from the visible indicators 512-516. For instance, the instructions may specify the type of optical signal transmitted by the visible indicators 512a-516a, indicators included in the individual layers that specify boundaries between layers (e.g., a wavelength bandwidth within the visible light spectrum), or associated user credential data that are embedded within each layer.

As discussed previously with respect to FIG. 3A, the digital identifications 512-516 may represent different renderings of the digital identification 132 on the user device 130 based on the security status assigned to the digital identification 132 by the digital identification server 110. For instance, the security status may include an instruction to display a particular multi-layered visual indicator on the digital identification 132 based on various conditions.

The visual indicators 512a-516a may represent different types of visual indicators that may be displayed on the digital identification 132. In some instances, the visual indicators 512a-516a may be substantially similar to the visual indicators 312a-316 as depicted in FIG. 3A, except the visual indicators 512a-516a may include embedded user credential data within one of the data layers included in the visual indicators 512a-516a. The embedded credential data may be machine-readable credential data that is not perceptible to human eyes, but detectable by the detector device 140 using optical scanning techniques. In this regard, in additional to providing the ability to perform a visual verification of the digital identification 132 using the level one security protocol 142, the visual indicators 512a-516a may provide additional security by providing the ability to perform a secondary machine-readable verification of the digital identification 132 using the level two security protocol 144.

The multiple data layers of the visual indicators 512a-516a may include multiple optical features that enable the detector device 140 to detect each of the multiple data layers. For instance, the detector device 140 may use optical scanning techniques such as, for example, visual color layer deselection and/or visual color layer fusion to extract embedded user credential data that are used to verify the authenticity of the digital identification 132. For example, the embedded user credential data may include a light-wavelength spectrum, a checksum, or encrypted data payloads.

In some implementations, the detector device 140 may include an ultraviolet (UV) transceiver to detect an UV signal transmitted from the digital identification 132 and/or an infrared (IR) transceiver to detect an IR signal transmitted from the digital identification 132.

The visual color layer deselection technique involves detection of the multiple layers of visible indicators 512a-516a by the detector device 140 and the separation of each individual layer to generate the set of deselected layers 532. The detector device 140 may use the deselection list 524 received from the digital identification server 110 to initially identify each individual layer, and use an applicable optical scanning technique to deselect the individual layers.

In some instances, the visual color layer deselection may be performed by the detector device 140 under visible light limitations of commercial-off-the-shelf (COTs) personal computing devices that are commonly used in security authentication applications. In such instances, the detector device may use specific visual light filters to select specific color layers from the visible indicators 512a-516a displayed on the digital identification 132 but may not be visible to human eyes. In this regard, the visual color layer deselection technique may be used to extract non-visible, machine-readable user credential data that may be included in various types of visible indicators as described previously.

Each individual color layer may include particular graphical information that, when combined with the other color layers, generates a cumulative graphical representation that is viewable to a user or user. For instance, the contents of each individual layer may include graphical patterns that have an associated frequency ranges and/or wavelength ranges such that light filters of particular frequency and wavelength ranges may be used to separate individual layers within the cumulative graphical representation.

Examples of light filters that may be used by the detector device 140 may include absorptive or dichroic filters that are capable of filtering reflective light off the surface of the display of the user device 130 in various directions. In addition, the light filters may include longpass filters to filter longer wavelengths, short pass filters to filter shorter wavelengths, or bandpass filters to filter a particular bandwidth of filters (e.g., corresponding bandwidth wavelength of an individual layer). In some instances, the passband of the bandpass filters may be configured to be narrower to wider to adjust transitions between maximal and minimal transmissions to improve layer deselection.

The graphical patterns of the individual layers may include subsets of features of the cumulative graphical representation (e.g., individual colors of a color palate of the visual indicator). Deselection of individual layers using the visual color layer deselection technique may be used to remove subsets of features associated with particular layers and generate various permutations of cumulative graphical representation with one or more layers removed from the cumulative graphical representation. In this regard, different sets of user credential data, associated with various graphical representations, may be generated using different deselection configurations (e.g., removing specific combinations of layers). As such, the visual indicators 512a-516a may be used to generate varying patterns of user credential data that may be used to verify the digital identification 132.

The extracted user credential data 534 from the set of deselected layers 532 may include various types of user credential data that may be used to verify the authenticity of the digital identification 132. For instance, in one example, the user credential data 534 may include a light wavelength spectrum that may be used as a digital signature for the digital identification 132. The light wavelength spectrum may include characteristic peaks and troughs that may be compared against a reference light wavelength spectrum stored in user entry for the digital identification 132 within the digital identification database 112.

In another example, the extracted user credential data 534 may be a unique checksum that is calculated based on the aggregating distributions of features within the set of deselected layers 532. In such examples, each individual layer of the set of deselected layers 532 may be an image, and the unique checksum may be computed based on computing the average pixel value for each individual layer and combining the average pixel values using a particular mathematical expression. In yet another example, the extracted user credential data 534 may be an encrypted data packet that is extracted from an individual layer within the set of deselected layers 532. For instance, the encrypted data packet may be embedded within spatial features of the individual layer within the set of deselected layer.

Figure 5B:
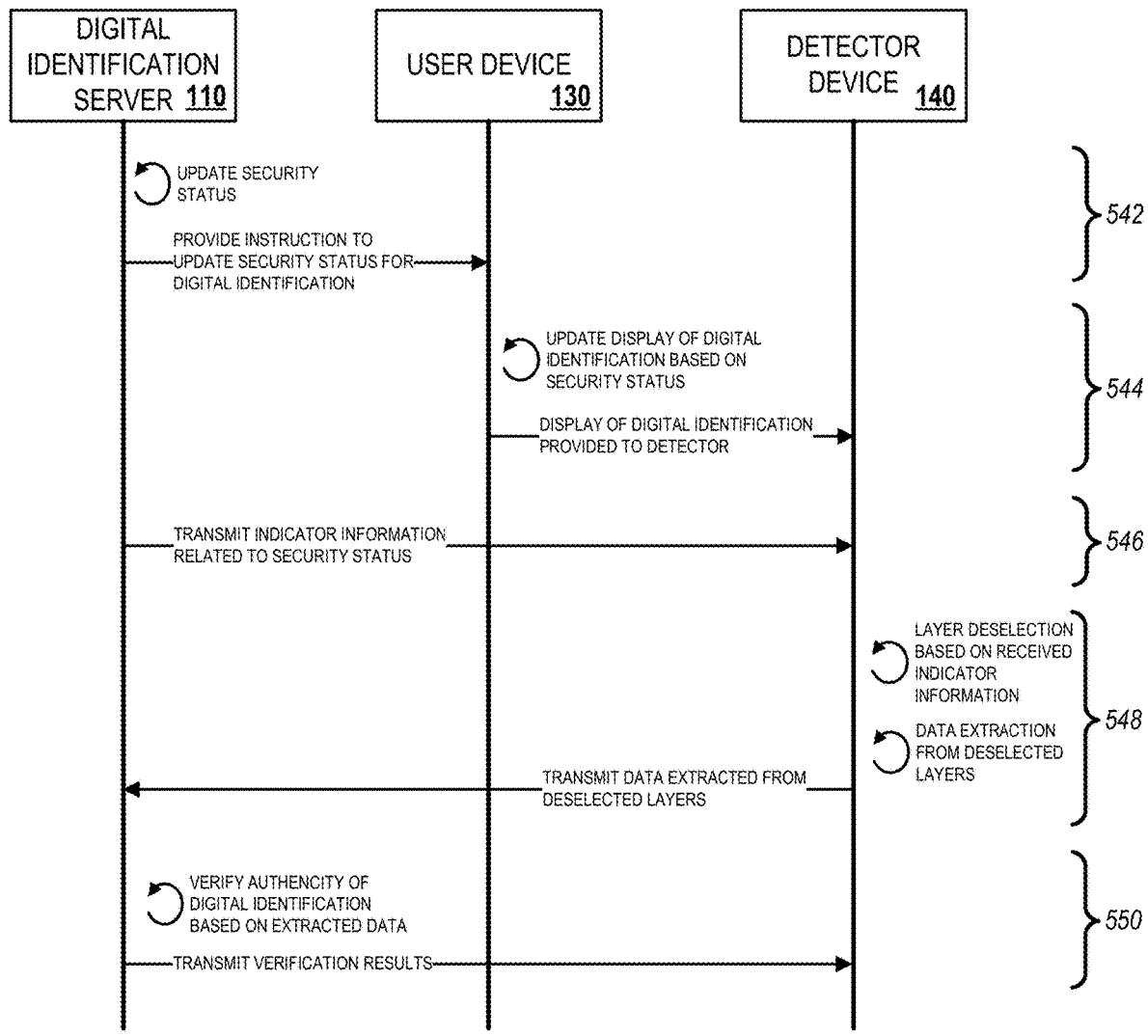
FIG. 5B illustrates an interaction diagram between a digital identification server, a user device, and a detector device during an example process for verifying a digital identification using visual indicators with embedded user credential data.

FIG. 5B illustrates an interaction diagram 500B between the digital identification server 110 and the user device 130 during an example process for verifying a digital identification using visual indicators with embedded user credential data. Briefly, the digital identification server 110 may update the security status of the digital identification 132 and provide an instruction to the user device 130 assigning the updated security status (542), the user device 130 may update the display of the digital identification 132 based on the received instruction from the digital identification server (544), the digital identification server 110 may transmit visual indicator information related to the assigned security status to the detector device 140 (546), the detector device 140 may perform a layer deselection operation based on the received indicator information, extract user credential data from the deselected layers, and transmit the user credential data from the selected layers to the digital identification server 110 (548), and the digital identification server 110 may verify the digital identification 132 and transmit the verification results for display on the detector device 140 (550).

In more detail, the digital identification server 110 may update the security status of the digital identification 132 and provide an instruction to the user device 130 assigning the updated security status (542). For instance, as described previously, the digital identification server 110 may update the security status of the digital identification 132 such that the display of the digital identification 132 is updated to show a visual indicator that is specified by the updated security status. In some implementations, the security status may be updated based on a specified time-based schedule that periodically updates the security status. Alternatively, in other implementations, the security status may be updated based on milestone events (e.g., user updating account information), or based on the specific type of user information included within the digital identification 132.

The user device 130 may update the display of the digital identification 132 based on the received instruction from the digital identification server (544). For instance, as described previously, the user device 130 update the rendering of digital identification to display an updated visible indicator that is specified by the updated security status assigned by the digital identification server. For example, the instruction to update the security status for the digital identification 132 from the digital identification server 110 may include a reference to a particular visual indicator, and in response to receiving the instruction, the user device may select the particular visual indicator from a list of locally stored visual indicators and update the rendering of the digital identification 132 to show the particular visual indicator on the digital identification 132.

The digital identification server 110 may transmit visual indicator information related to the assigned security status to the detector device 140 (546). For instance, as described previously, the digital identification server 110 may transmit the deselection list 524 including a list of individual layers within the visual indicators 512a-515a displayed on the digital identification 132 and optical properties associated with the individual layers may be used to perform the layer deselection procedure. In some instances, the detector device 140 may be a client device that is available to the authorized user (e.g., a government-issued laptop, phone, or tablet) and is configured to receive security information from the digital identification server 110. In other instances, the detector device 140 may be a computing device of a security terminal of an issuing authority that is used to relay updated security information to personnel of the issuing authority that regularly verify the authenticity of digital identification 132 (e.g., transportation security agency personnel).

The detector device 140 may perform a layer deselection operation based on the received indicator information, extract user credential data from the deselected layers, and transmit the user credential data from the selected layers to the digital identification server 110 (548). For instance, as described previously, the detector device 140 may initially detect the individual layers within the visual indicators 512a-516a displayed on the digital identification 132 based on the optical properties of the individual layers included within the deselection list 524. In some examples, the detector device may use light filters to separate the individual layers of the visual indicators 512a-512b and generate the list of deselected layers 532. The detector device 140 may then extract the credential data 534 that may be embedded within each individual deselected layer. The extracted user credential data 534 may then be transmitted to the digital identification server 110.

The digital identification server 110 may verify the digital identification 132 and transmit the verification results for display on the detector device 140 (550). For instance, as described previously, the digital identification server 110 may compare the user credential data 534 extracted from the set of deselected layers 532 to the expected user credential data designated by the assigned security status. If the extracted user credential data 534 matches the expected user credential data that is designated by the assigned security status, then the digital identification server 110 may determine that the digital identification 132 is valid. Alternatively, if the extracted user credential data 534 does not match the expected user credential data designated by the assigned security status, then the digital identification server 110 may determine that the digital identification 132 is invalid. The results of the verification may then be transmitted to as a notification to the detector device 140 so that an authorized user conducting the verification can determine the validity of the digital identification 132.

Although FIG. 5B depicts the digital identification server 110 performing the verification of the digital identification 132 using the extracted user credential data 534, in some implementations, the verification operation may instead be performed on-device by the detector device 140 after extracting the user credential data 534 from the set of deselected layers 532. In such implementations, the assigned security status may include instructions to perform the verification operation locally on the detector device 140. The instructions may include computer-readable programs that enable the detector device 140 to compare the extracted user credential data 534 and the expected credential data designated by the assigned security status. In this regard, once the detector device 140 receives the information related to the security status of the digital identification 132, the detector device 140 may perform the verification operation offline without connectivity to the digital identification server 110.

Figure 5C:
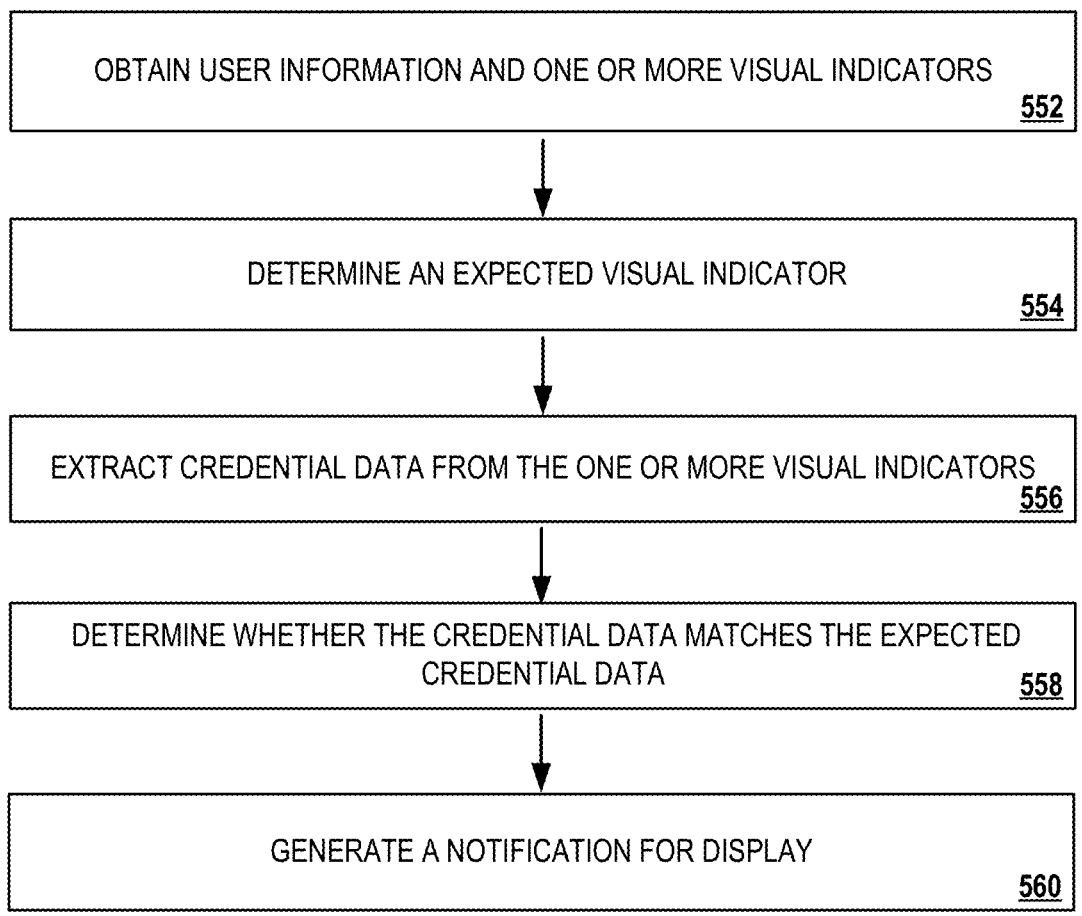
FIG. 5C is a flowchart of an example process for verifying a digital identification using encrypted visual indicators.

FIG. 5C is a flowchart of an exemplary process 500C for verifying a digital identification using visual indicators with embedded user credential data. Briefly, the process 5000 may include obtaining user information and one or more visual indicators (552), determining an expected visual indicator (554), extracting credential data from each of the one or more visual indicators (556), determining whether the credential data matches the expected credential data (558), and generating a notification for display (560).

In more detail, the process 5000 may include obtaining user information and one or more visual indicators (552). For instance, the detector device 140 may capture of an image of user information of the digital identification 132 and one or more visual indicators, such as the visual indicators 512a-516a depicted in FIG. 5A, displayed on the digital identification 132.

The process 5000 may include determining an expected visual indicator (554). For instance, the detector device 140 may determine an expected visual indicator to be displayed on the digital identification 132. In some instances, the determination may be based on the detector device 140 accessing the repository on the digital identification server 110 to identify a designated visual indicator as the expected visual indicator. In such instances, the detector device 140 may access, from the digital identification server 110 and based at least on the obtained user information from the digital identification 132, a repository that indicates a visual indicator to be displayed on the digital identification, and credential data associated with the expected visual indicator. In some implementations, the repository may be the digital identification database 112.

The process 5000 may include extracting credential data from the one or more visual indicators (558). For instance, the detector device 140 may extract the user credential data 534 from the one or more visual indicators 512a-516a displayed on the digital identification 132 based on the expected visual indicator.

In some implementations, the detector device 140 may initially receive, from the digital identification server 110, an instruction to extract the user credential data 534 from the one or more visual indicators 512a-516a displayed on the digital identification 132. In some implementations, the instruction may include the deselection list 524, which specifies one or more layers of the visual indicators 512a-516a. The detector device 140 may then use the instruction to extract the user credential data 534 from the one or more visual indicators 512a-516a displayed on the digital identification 132.

The process 5000 may include determining whether the credential data extracted from each of the one or more visual indicators matches the credential data (562). In some instances, the detector device 140 may determine that the user credential data 534 extracted from each of the one or more visual indicators 512a-516a displayed on the digital identification 132 does not match the credential data associated with the expected visual indicator to be displayed on the digital identification 132.

The process 5000 may include generating a notification for display (560). For instance, in response to determining that the user credential data 534 extracted from each of the one or more visual indicators 512a-516a displayed on the digital identification 132 does not match the credential data associated with the expected visual indicator to be displayed on digital identification 132, the detector device 140 may provide a notification for display indicating that the digital identification 132 is invalid or may potentially be a counterfeit digital identification. In another example, the detector device 140 may transmit a signal to the digital identification server 110, which may then transmit an alert indicating the fraudulent attempt to the user device 130 associated with the digital identification 132 within the user record. Alternatively, in response to determining that the user credential data 534 matches the credential data associated with the expected visual indicator, the detector device 140 may provide an indication of a positive verification of the digital identification 132.

Figure 6A:
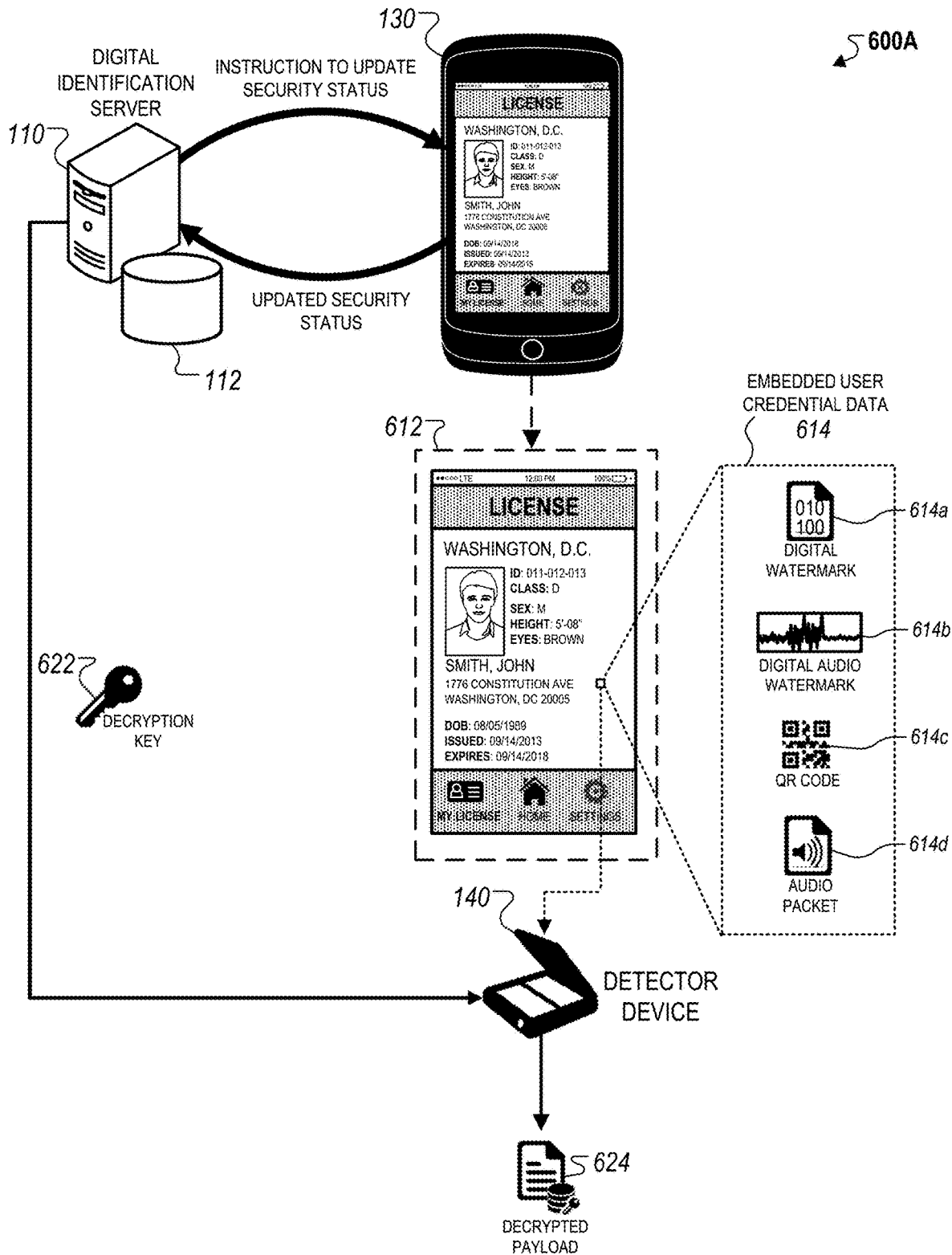
FIG. 6A illustrates a block diagram of a system using invisible user credential data that may be included in a digital identification.

FIG. 6A illustrates a block diagram of an example system using embedded user credential data 614 that may be embedded in the digital identification 132. Briefly, the user device 130 may exchange communications with the digital identification server 110, and generate the digital identification 132 including embedded user credential data 614. The detector device 140 may detect and extract the embedded user credential data 614 from the digital identification 132. The detector device 140 may then receive a decryption key 622 from the digital identification server 110, which is used to decrypt the embedded user credential data and extract a decrypted payload 634 that is used to verify the digital identification 132.

The embedded user credential data 614 may represent user credential data that rendered on the digital identification 132 but not visible to humans. For instance, the embedded user credential data 614 may be digital data packets that are embedded within the digital identification 132 such that extraction of the embedded user credential data 614 generates user information that may be used to verify the digital identification 132 and protect against fraudulent use. For instance, as depicted in FIG. 6A, the embedded credential data 614 may include various types of encrypted data such as a digital watermark 614a, a digital audio watermark 614b, a QR code 814c, and an audio packet 614d.

The digital watermark 614a may include one or more graphical patterns that include encrypted payloads of user information. In one example, the digital watermark 614a may be static representation of graphical pattern (e.g., a picture or a combination of symbols). In another example, the digital watermark 614a may be a time-lapse representation of a video watermark. The encrypted payloads of user information may include secure user information such as personally identifiable information of the user as described previously.

In some implementations, the digital watermark 614a may additionally include checksum information that is a small-size datum from an arbitrary digital data block within the embedded user credential data 614 that is used for error checks during data transmission and/or storage. The checksum information may also be used to verify data integrity of the encrypted payloads of user information.

The detector device 140 may detect the digital watermark 614a using visual light detection of optical signals transmitted by the graphical patterns of the digital watermark 614a. In some implementations, the detector device 140 may include software that is configured to detect watermark signals that are generated by the digital identification 132. For example, the digital identification 132 may be presented under a scanner of the detector device 140, which may optically scan the surface of the digital identification 132 to determine if the digital watermark 614a may be detected within the digital identification 132.

The digital audio watermark 614b may be an audible tone embedded within the digital identification 132 that may play a particular sound pattern. For example, in some instances, the particular sound pattern may be automatically activated by the detector device 140 upon transmitting an activation signal to the user device 130. In other instances, the particular sound pattern may be activated after receiving a user input that enables the digital audio watermark 614b. In these instances, the detector device 140 may be configured to detect audio (e.g., using a microphone) and encoding audio data into a waveform.

The QR code 614c may be a matrix barcode or a two dimensional barcode that is a machine-readable optical label included within the digital identification 132. The QR code 614c may be placed on any region of the digital identification 132 and used to encode secure user information. For instance, the QR code 614c may use standard encoding techniques (e.g., numeric, alphanumeric, byte/binary, kanji, etc.) to store data associated with user information. In some implementations, instead of being displayed directly on the digital identification 132, the QR code 614c may be displayed on in response to receiving a user input activating a setting that displays the QR code 614c. For instance, a user swipe motion may be used to provide an additional screen on a user interface displayed on the digital identification 132 that shows the QR code 614c.

The audio packet 614d may be a data packet that includes a set of embedded audio tones within the digital identification 132 that encode encryption user information. For instance, similar to the digital audio watermark 614b, the audio packet 614d may include patterns of audible tones that are used to encrypt the encoded user information (e.g., particular patterns of audible tones representing certain characters included in the user information). The detector device 140 may be used to record the audio tones included in the audio packet 614d, recognize set of patterns, and decode the user information encoded within the audio packet 614d.

Although FIG. 6A depicts examples of embedded user credential data 614, in some implementations, the digital identification 132 may additionally include other types of embedded features. For instance, in one example, the digital identification 132 may include an authorized user access feature that enables an authorized user such as a law enforcement officer, personnel associated with the issuing authority, or other types of security personnel to extract the embedded user credential data from the digital identification 132 to perform a verification operation. For example, the authorized access feature may include a separate display screen on the digital identification 132 that initially requests authentication by the authorized user (e.g., use of a specialized PIN, swipe pattern, or other types of credential data). In response to receiving the authorized user credential data, the digital identification 132 may enable an authorized device associated with the authorized user to extract the embedded user credential data 614. In this regard, the authorized user access feature may be used to verify the digital identification 132 in situations where forensic analysis by the use of other highly specialized devices is not available (e.g., a traffic stop, or a street-level stop-and-search).

As described above, the embedded user credential data 614 may include user information in the form of encrypted payloads. For instance, the encrypted payloads may be data packets of user information that is restricted for access by the digital identification server 110. For example, the digital identification server 110 may generate the encrypted payloads using encryption techniques such as, for example, creating a unique, fixed-length hash signature for the encrypted payload, using private key cryptographic techniques, or using a public-key cryptographic techniques that includes the use of an encryption key to encrypt all user payloads, and the use of a specific decryption key that is provided to authorized devices.

After the detector device 140 extracts the encrypted payloads from the embedded user credential data 614, the detector device 140 may be provided with the decryption key 622 to decrypt the encrypted payloads and generate the decrypted payload 624. For instance, as described above, the decryption key 622 may vary based on the particular encryption technique utilized by the digital identification server 110 used to generate the encrypted payloads that are encoded in the embedded user credential data 614. For example, where the encrypted payloads are generated using hashing, the decryption key 622 may be the unique hash that is used to encrypt the encrypted payloads. In another example where the encrypted payloads are generated using a private-key, the decryption key 622 may be the private-key used to encrypt the encrypted payloads. In yet another example where the encrypted payloads are generated using a public-key, the decryption key 622 may be a decryption key that is associated with the public-key and maintained by the digital identification server 110.

The decrypted payload 624 may include user information, which is used by the detector device 140 to verify the user information included in the digital identification. For example, in some instances, the detector device 140 may transmit the user information included in the decrypted payload 624 to the digital identification server 110, which may compare the received user information to the user entry for the digital identification on the digital identification server 110. In this example, if the received user information matches the user information included in the user entry within the digital identification database 112, then the digital identification server 110 may transmit an instruction to the detector device to display a notification that the digital identification 132 is valid.

In some implementations, the verification of the user information included in the decrypted payload 624 may be performed on-device on the detector device 140. In such implementations, in addition to transmitting the decryption key 622, the digital identification server 110 may additionally transmit user information designated by the assigned security status of the digital identification 132, and instructions to perform a comparison between the user information designated by the assigned security status of the digital identification 132 and the user information included in the decrypted payload 624. In this regard, after receiving an initial transmission from the digital identification server 110, the detector device 140 may be used to perform the verification of the digital identification 132 offline without network connectivity to the digital identification server 110, which may enable the verification of the digital identification 132 without access to the user entry on the digital identification database 112.

Figure 6B:
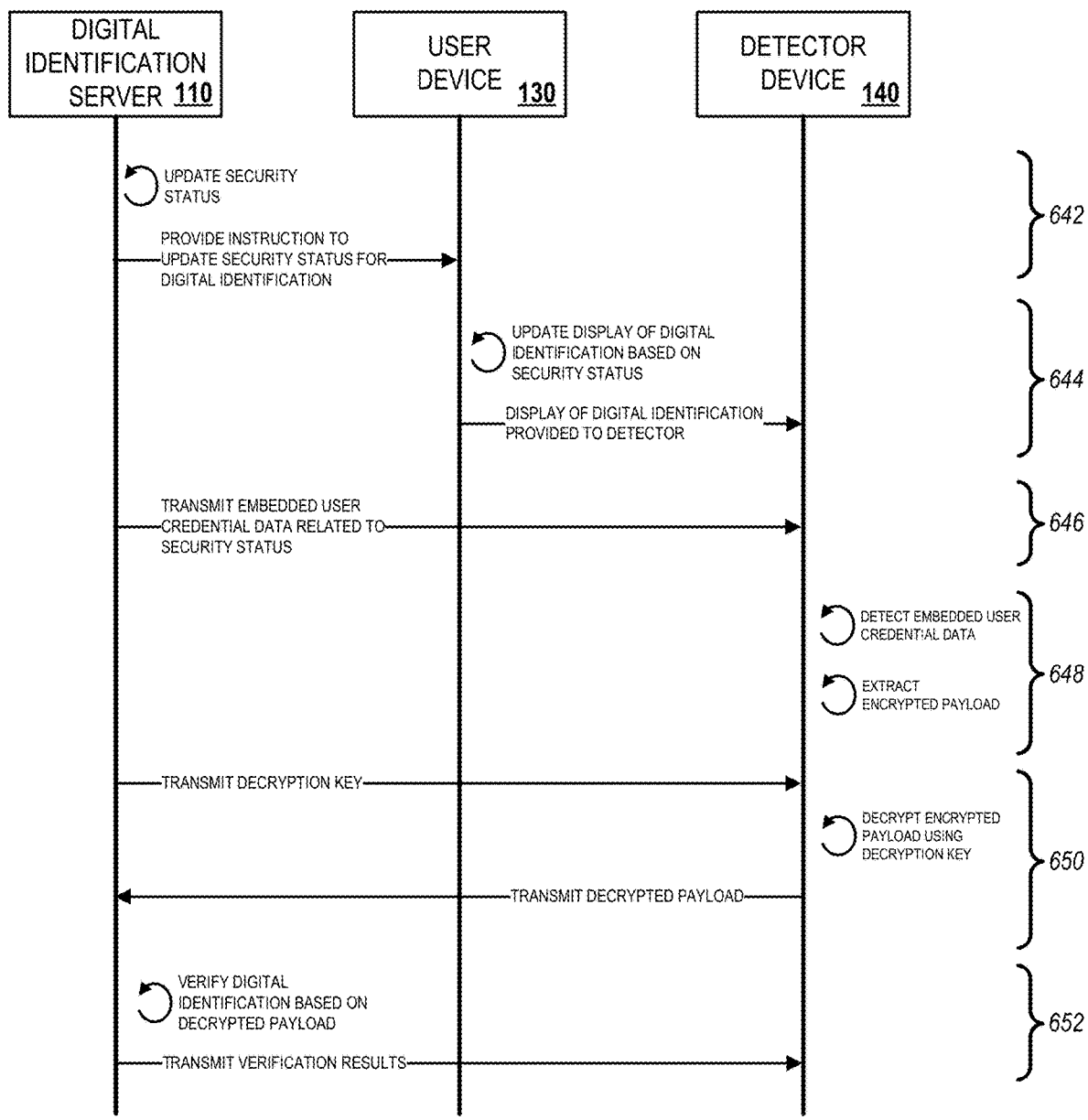
FIG. 6B illustrates an interaction diagram between a digital identification server, a user device, and a detector device during an example process for verifying a digital identification using embedded user credential data.

FIG. 6B illustrates an interaction diagram 600B between the digital identification server 110, the user device 130, and the detector device 140 during an example process for verifying the digital identification 132 using embedded user credential data. Briefly, the digital identification server 110 may update the security status of the digital identification 132 and provide an instruction to the user device 130 assigning the updated security status (642), the user device 130 may update the display of the digital identification 132 based on the received instruction from the digital identification server (644), the digital identification server 110 may transmit embedded user credential information related to the assigned security status to the detector device 140 (646), the detector device 140 may detect the embedded user credential data 614 and a extract encrypted payload (648), the digital identification server 110 may transmit the decryption key 622 to the detector device 140, the detector device 140 may decrypt the encrypted payload using the decryption key, and transmit the decrypted payload 624 to the digital identification server 110 (650), and the digital identification server 110 may verify the digital identification 132 using the decrypted payload and transmit the verification results to the detector device 140 (651).

In more detail, the digital identification server 110 may update the security status of the digital identification 132 and provide an instruction to the user device 130 assigning the updated security status (642). For instance, as described previously, the digital identification server 110 may update the security status of the digital identification 132 such that the display of the digital identification 132 is updated to show a visual indicator that is specified by the updated security status. In some implementations, the security status may be updated based on a specified time-based schedule that periodically updates the security status. Alternatively, in other implementations, the security status may be updated based on milestone events (e.g., user updating account information), or based on the specific type of user information included within the digital identification 132.

The user device 130 may update the display of the digital identification 132 based on the received instruction from the digital identification server (644). For instance, as described previously, the user device 130 may update the rendering of digital identification to display an updated visible indicator that is specified by the updated security status assigned by the digital identification server. For example, the instruction to update the security status for the digital identification 132 from the digital identification server 110 may include a reference to a particular visual indicator, and in response to receiving the instruction, the user device may select the particular visual indicator from a list of locally stored visual indicators and update the rendering of the digital identification 132 to show the particular visual indicator on the digital identification 132.

The digital identification server 110 may transmit embedded user credential information related to the assigned security status to the detector device 140 (646). For instance, as described previously, the digital identification server 110 may transmit patterns associated with the embedded user credential data 614 to the detector device 140. The patterns may include specific identifying information associated with the embedded user credential data 614 that enable the detector device 140 to detect the embedded user credential data 614 within the digital identification 132. In some instances, the detector device 140 may be a client device that is available to the authorized user (e.g., a government-issued laptop, phone, or tablet) and is configured to receive security information from the digital identification server 110. In other instances, the detector device 140 may be a computing device of a security terminal of an issuing authority that is used to relay updated security information to personnel of the issuing authority that regularly verify the authenticity of digital identification 132 (e.g., transportation security agency personnel).

The detector device 140 may detect the embedded user credential data 614 and an extract encrypted payload (648). For instance, as described previously, the detector device may use the received patterns including identifying information to detect the embedded user credential data 614. In one example, the detector device 140 may use optical scanning techniques to detect the digital watermark 614*a* or the QR code 614*c* that may be displayed on the digital identification 132. In another example, the detector device 140 may use an audio scanning technique to detect audible tones that may be included in the digital audio watermark 614*b* and the audio packet 614*d*. The detector device 140 may then extract encrypted payloads that are encoded by the embedded user credential data 614. As described previously, the extracted encrypted payload may include user information.

The digital identification server 110 may transmit the decryption key 622 to the detector device 140, the detector device 140 may decrypt the encrypted payload using the decryption key 622, and transmit the decrypted payload 624 to the digital identification server 110 (650). For instance, as described previously, the decryption key 622 may specified by the security status assigned to the digital identification 132. In some implementations, the decryption key 622 may be associated with an encryption protocol used by the digital identification server 110 used to encrypt the encrypted payload included within the embedded user credential data 614. The detector device 140 may decrypt the encrypted payload by applying the decryption key 622, and generating the decrypted payload 624. The decrypted payload 624 may include user information that may be used to verify the digital identification 132. The detector device 140 may then transmit the decrypted payload 624 to the digital identification server 110.

The digital identification server 110 may verify the digital identification 132 using the decrypted payload and transmit the verification results to the detector device 140 (651). For instance, as described previously, the digital identification server 110 may verify the digital identification 132 by comparing the user information included in the decrypted payload 624 and user information that is designated by the assigned security status. If the user information included in the decrypted payload 624 matches the expected user information that is designated by the assigned security status, then the digital identification server 110 may determine that the digital identification 132 is valid. Alternatively, if the user information included in the decrypted payload 624 does not match the expected user information designated by the assigned security status, then the digital identification server 110 may determine that the digital identification 132 is invalid. The results of the verification may then be transmitted to as a notification to the detector device 140 so that an authorized user conducting the verification can determine the validity of the digital identification 132.

Although FIG. 6B depicts the digital identification server 110 performing the verification of the digital identification 132 using the user information included in the decrypted payload 624, in some implementations, the verification operation may instead be performed on-device by detector device 140 after decrypting the encrypted payload extracted from the embedded user credential data using the decryption key 622. In such implementations, the assigned security status may include instructions to perform the verification operation locally on the detector device 140. The instructions may include computer-readable programs that enable the detector device 140 to compare the user information included in the decrypted payload 624 and the expected user information designated by the assigned security status. In this regard, once the detector device 140 receives the information related to the security status of the digital identification 132, the detector device 140 may perform the verification operation offline without connectivity to the digital identification server 110.

Figure 6C:
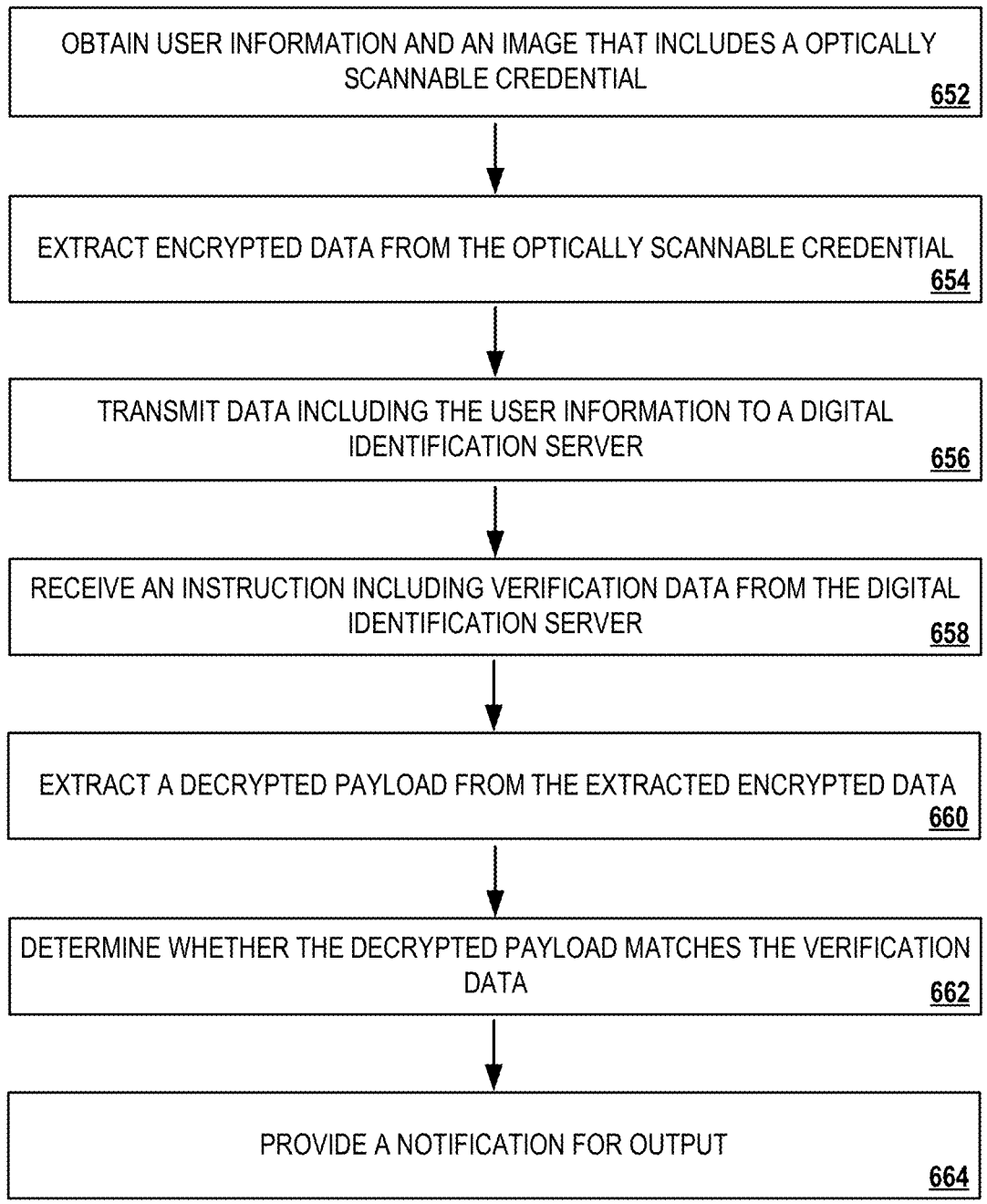
FIG. 6C illustrates a flowchart of an example process for verifying a digital identification using embedded user credential data.

FIG. 6C is a flowchart of an exemplary process 6000 for verifying a digital identification using invisible credentials. Briefly, the process 6000 may include obtaining user information and an image that includes a optically scannable credential (652), extracting encrypted data from the optically scannable credential (654), transmitting data including the user information to a digital identification server (656), receiving an instruction including verification data from the digital identification server (658), extracting a decrypted payload from the extracted encrypted data (660), determining whether the decrypted payload matches the verification data (662), and providing a notification for output (664).

In more detail, the process 6000 may include obtaining user information and an image that includes an optically scannable credential (652). For instance, the detector device 140 may obtain, from the user device 130, user information from the digital identification 132, and an image that includes the embedded user credential 614 included in the digital identification 132.

The process 6000 may include extracting encrypted data from the optically scannable credential (654). For instance, the detector device 140 may extract the encrypted data of the embedded user credential data 614 included in the digital identification 132 on the user device 130.

The process 6000 may include transmitting data including the user information to a digital identification server (656). For instance, the detector device 140 may transmit, to the digital identification server 110, data including the user information from the digital identification 132 on the user device 130.

The process 6000 may include receiving an instruction including verification data from the digital identification server (658). For instance, the detector device 140 may receive, from the digital identification server 110, an instruction including verification data associated with the digital identification 132 on the user device 130. In some implementations, the verification data may additionally include the decryption key 622.

The process 6000 may include extracting a decrypted payload from the extracted encrypted data (660). For instance, the detector device 140 may extract the decrypted payload 634 from the encrypted data extracted from the embedded user credential data 614 included in the digital identification 132 on the user device 130 using the decryption key 622 for the encrypted data.

The process 6000 may include determining whether the decrypted payload matches the verification data (662). In some instances, the detector device 140 may determine that the decrypted payload 634 from the encrypted data extracted from the embedded user credential data 614 included in the digital identification 132 on the user device 130 does not match the verification data received from the digital identification server 110 and associated with the digital identification 132 on the user device 130. Alternatively, in other instances, the detector device 140 may determine that the decrypted payload 624 matches the verification data received from the digital identification server 110 and associated with the digital identification server 132.

The process 6000 may include providing a notification for output (664). For instance, the detector device 140 may provide a notification for output display on the detector device 140. The notification may represent the authenticity of the digital identification 132 based on determining whether the decrypted payload 634 from the encrypted data of the embedded user credential data 614 included in the digital identification 132 on the user device 130 matches the verification data received from the digital identifications server 110 and associated with the digital identification 132 on the user device 130.

FIGS. 7A-7D illustrate example systems 700A-700D for validating user information included in a digital identification. In general, the systems 700A-700D may utilize level three security protocols 146 that enable an application framework, associated with an authorized agency (e.g., law enforcement agency, government agency, etc.), to validate user information included in the digital identification 132.

In general, the system 700A depicts validation of user information when the user device 130 does not presently have connectivity to the digital identification server 110, the system 700B depicts validation of user information when the user device 130 does presently have connectivity to the digital identification server 110, the system 7000 depicts validation of user information using a physical identification when the user device 130 is unavailable, and 700D system depicts validation of the user information using a facial image when the user device 130 and the physical identification are both unavailable.

Figure 7A:
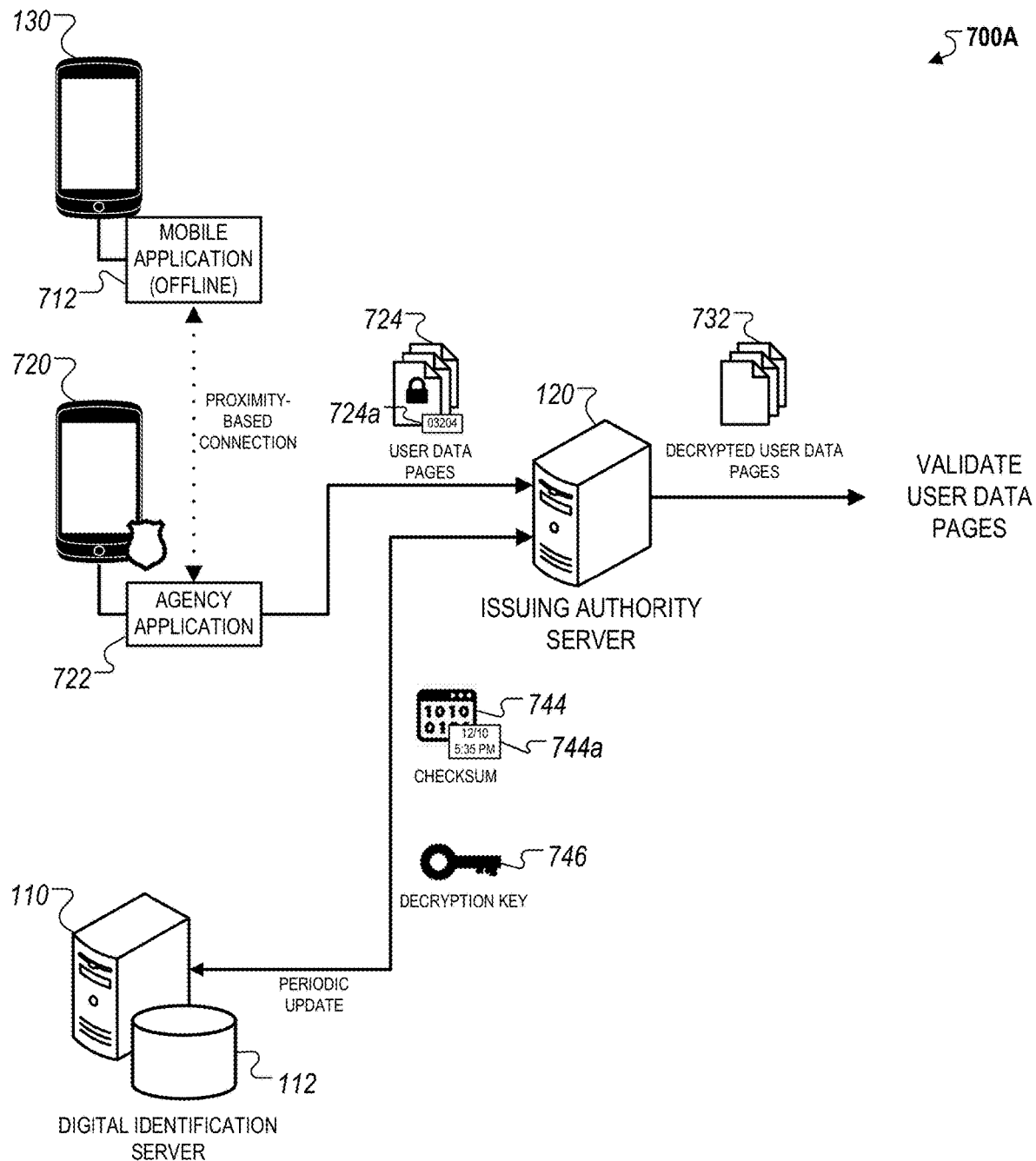
FIGS. 7A-7D illustrate block diagrams of example systems using various validation processes for user information included in a digital identification.

Referring to FIG. 7A, the user device 130 including a mobile application 712 may establish a proximity-based connection with an authorized device 720. The authorized device 720 may extract encrypted user information 724 from the user device 130 over the proximity-based connection, and transmit the encrypted user information 724 to an authorized agency server 120, which may periodically exchange communications with the digital identification server 110.

The authorized agency server 120 may receive a variable checksum 744 and decryption key 746 during periodic updates with the digital identification server. The authorized agency server 120 may use the variable checksum 744 to determine when the encrypted user information 724 was last synchronized with the digital identification server 110, and determine the applicable decryption key 746 to decrypt the encrypted user information 724 and generate decrypted user information 732. The authorized agency server 120 may then validate the user information included within the decrypted user pages 732.

In some implementations, the authorized device 720, the authorized agency server 120, and the digital identification server 110 may be connected over an authorized agency application framework. For example, the authorized agency application framework may enable the authorized device 720 of a particular authorized user (e.g., a law enforcement officer, security personnel, or other identification checking personnel) to receive user credential data (e.g., the variable checksum 744 and the decryption key 746) that may be necessary to extract user information from the digital identification 132 in circumstances when the user device 130 is unable to connect with the digital identification server 110. In this example, the issuing authority server 120 may operate as a backend server that periodically exchanges communications with the digital identification server 110 to retrieve user credential data necessary to decrypt the encrypted user data pages 724 from the digital identification 132.

The authorized device 720 may include an agency application 722. For instance, the agency application 722 may be a mobile application installed on the authorized device 720 that is configured to detect the presence of the user device 130 within a certain proximity. In one example, the agency application 722 may use a Bluetooth connection to establish a connection with the user device 130 and extract the encrypted user data pages 724. Alternatively, in other examples, the agency application 722 may other types of connection protocols such as infrared (IR) communication, near-field communication (NFiC), or radio communication to establish a connection between the user device 130 and the authorized device 720. In some implementations, the transfer of the encrypted user data pages 724 may be executed between the mobile application 712 and the agency application 722.

The encrypted user data pages 724 may be a set of time-specified representations of the user information included in the digital identification 132. For instance, as depicted in FIG. 7A, each user data page within the encrypted user data pages 724 may include an associated variable checksum 724a that may include a timestamp associated with when each individual user data page was last updated with a security status by the digital identification server 110. In addition, the variable checksum 724a may include user credential data (e.g., a unique checksum) that is used to identify whether the user information included in the individual user data page is outdated, accurate, or authentic.

In one example, the variable checksum 724a may identify the timestamp of synchronization between the user device 130 and the digital identification server 110 for the particular user data page. In this example, if the encrypted user data pages 724 include multiple cached versions of the same user information within different user data pages, the identifier within the variable checksum 724a may be used by the authorized agency server 120 to determine the cache version that was the last synchronized, and hence, the most likely to include current user information.

In another example, the variable checksum 724a may include user credential data that may be used to determine whether the user information included within the encrypted user data pages 724 is actually associated with the user of the user device 130. In this example, the authorized agency server 120 may compare the user credential data within the credential 724 and current or previous user credential data included within the user entry within the digital identification database 112. In this regard, the variable checksum 724a may be used to detect fraudulent user data pages that include falsified user information.

The checksum 744 and the decryption key 746 may be examples of user credential data that are periodically exchanged between the authorized agency server 120 and the digital identification server 110. In some instances, each periodic exchange between the authorized agency server 120 and the digital identification server 110 may take place each time an updated security status is assigned with the digital identification 132. In such instances, if the updated security status designates a new variable checksum or a new decryption key for the digital identification 132, then the particular variable checksum and encryption that are stored locally on the authorized agency server 120 may be updated to reflect the updated security status. In this regard, the checksum 744 and the decryption key 746 that are locally stored on the authorized agency server 120 may be dynamically updated based on the security status assigned to the digital identification 132.

In some implementations, the checksum 744 and the decryption key 746 may additionally include an associated timestamp that is used by the authorized agency server 120. In such implementations, the authorizing agency server 120 may include a repository that includes a plurality of checksums and decryption keys from multiple periodic updates within a particular time period, and for each checksum and decryption key, an associated timestamp that indicates when each checksum and decryption key was generated or issued by the digital identification server 110.

In some instance, the authorizing agency server 120 may use the associate timestamps of the checksum 744 and decryption key 746 to determine when each individual user data page within the encrypted user data pages 724 extracted from the user device 130 were synchronized with the digital identification server 110. Based on this determination, the authorized agency server 120 may identify the latest synchronized user data page that may include the most updated user information. For example, the authorizing agency server 120 may match the variable checksum 724a of an individual user data page with the plurality of checksums within the repository of checksums and decryption keys, identify the particular checksum that matches the variable checksum 724a and determine that the associated timestamp of the particular checksum is the time point when the individual user data page was synchronized with the digital identification 110 server.

After obtaining the encrypted user data pages 724 and determining when each individual user data page 724 was synchronized with the digital identification server 110, the authorized agency server 120 may decrypt the encrypted user data pages 724 using the corresponding decryption key 746. For example, the authorized agency server may initially determine the corresponding decryption key 746 based on matching the issuance timestamp of the decryption key 746 and the time point representing when the individual user data page was synchronized by the digital identification server 110. The authorized agency server 120 may then generate the decrypted user data pages 732, which may be used to extract user information for digital identification 132.

The authorized agency server 120 may validate the user information with the decrypted user data pages 732 using substantially similar comparison techniques described previously with respect to the digital identification server 110. For instance, the authorized agency server 120 may compare the user information from the user data pages to the user information that is presently included in the user entry for the user within digital identification database 112. In one example, the authorized agency server 120 may perform the validation operation to determine whether the user data pages on the user device are invalid (e.g., expired digital identification 132). In another example, the authorized agency server 120 may perform the validation operation to determine whether the user data pages extracted from the user device 130 correspond to the actual user that presents the digital identification 132 (e.g., a user using another person's digital identification 132).

In some implementations, after validating the user data pages from the user device 130, the authorized agency server 120 may transmit the results of the validation to the authorized device 720 such. For instance, in such implementations, the validation results may be presented for display on the authorized device such that the authorized user may remotely determine the status of the digital identification 132 presented on the user device 130. In this regard, the system 700A may be used by an authorized user to remotely validate the digital identification 132 during times when the user device 130 lacks network connectivity. In one example, the system 700A may be used by a law enforcement officer during a random traffic stop to validate a digital driver license without the use of a separate law enforcement equipment.

Figure 7B:
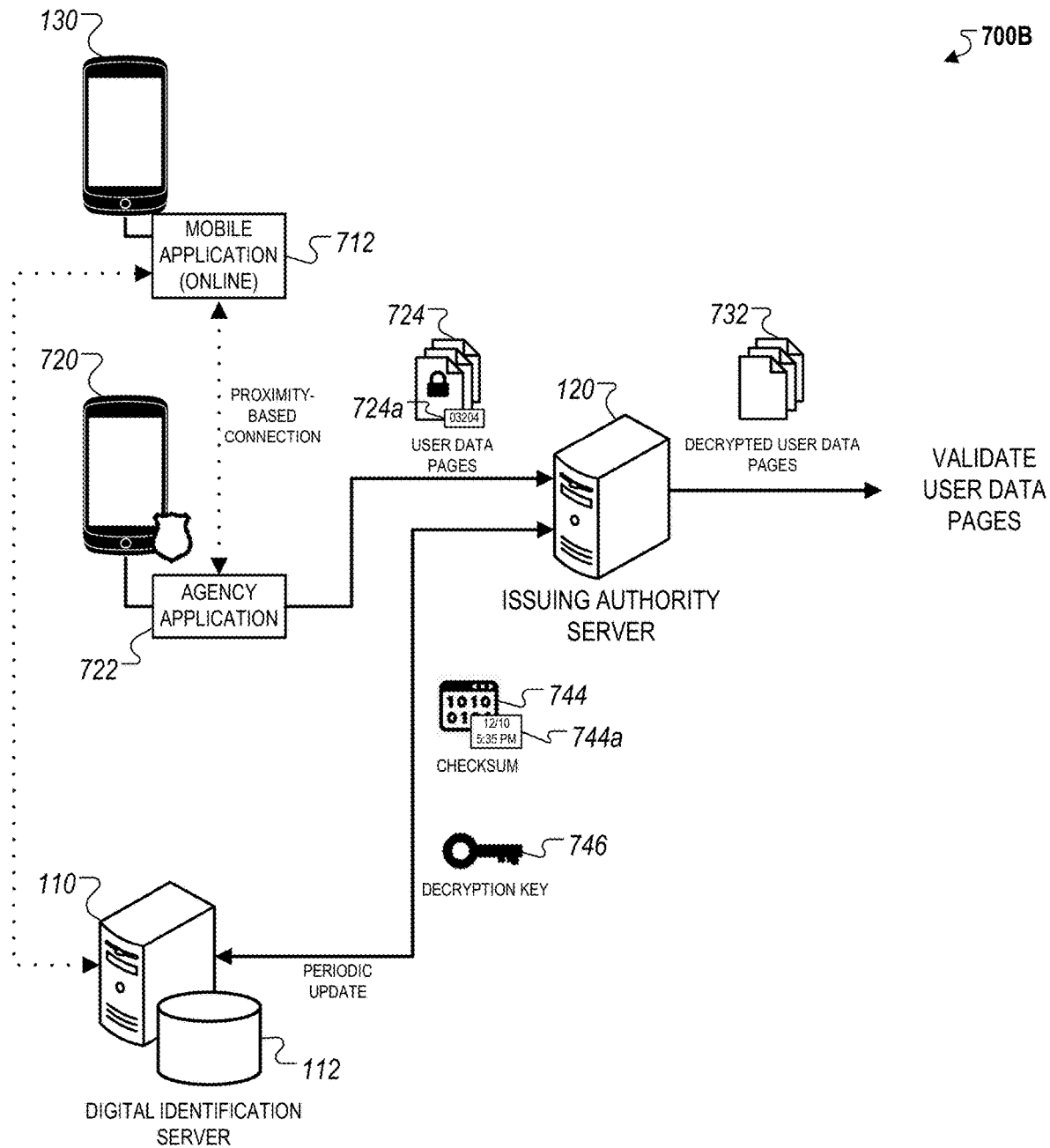

Referring now to FIG. 7B, the system 700B may be substantially similar to the system 700A depicted in 700A except that the user device 130 may presently have network connectivity to the digital identification server 110. As such, in addition to the agency application 722 having the ability to access the digital identification server 110 via the authorized agency server 120, the user device may also be capable of accessing the digital identification server 110. For example, the authorized device 720 may obtain the most recently updated user data pages from the user device 130 using the proximity-based connection as described with respect to FIG. 7A. In this example, after extracting the encrypted user data pages 724 from the user device 130, the system 700B may use similar techniques as the system 700A to validate the decrypted user data pages 732.

Figure 7C:
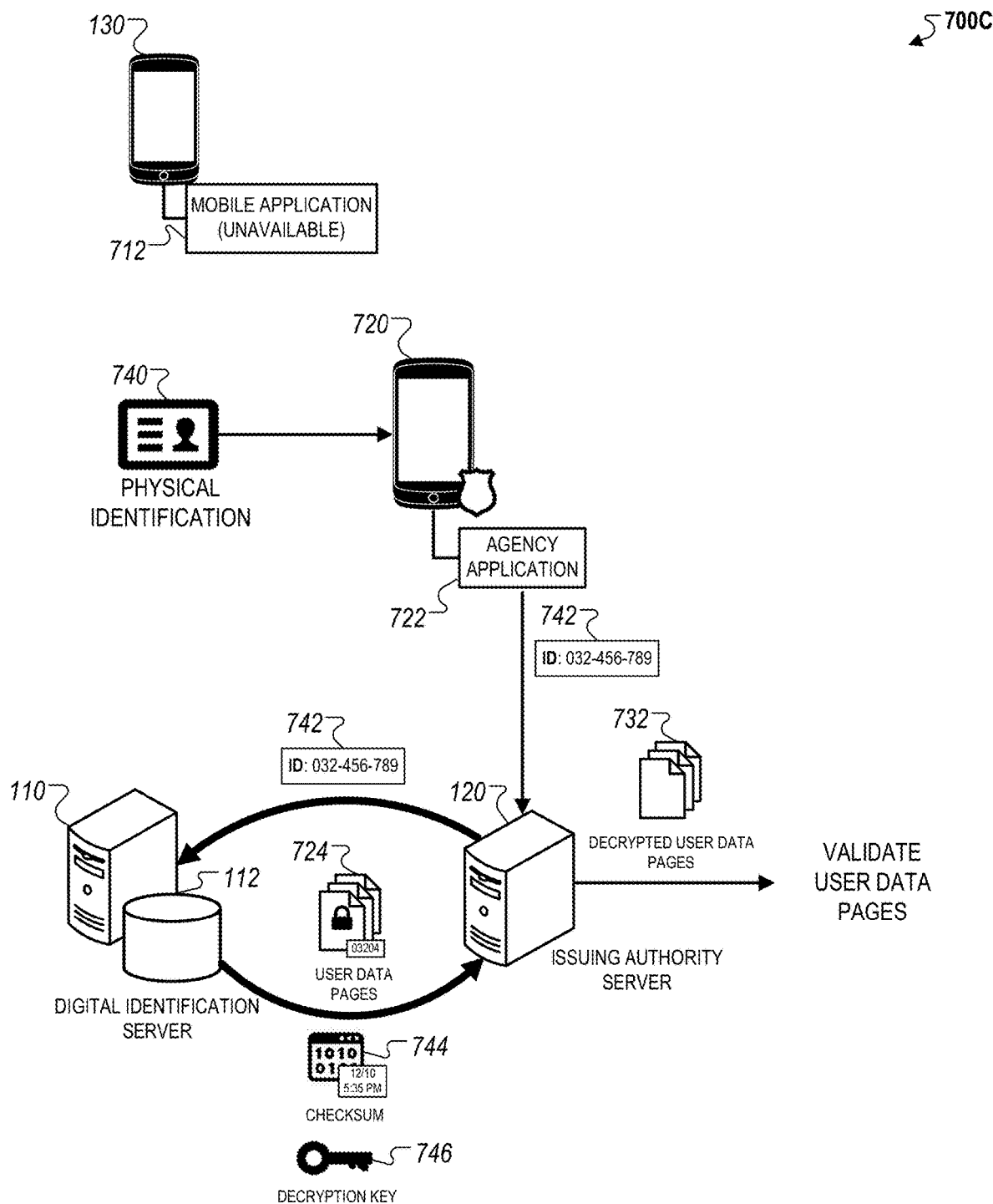

Referring now to FIG. 7C, the system 7000 may be used to validate user information from a physical identification for a user when the user device 130 is either inaccessible or otherwise unavailable. For instance, the system 7000 may be used in circumstances where the user device 130 has either been lost or stolen. In such instances, because user data pages from the digital identification 132 are unable to be accessed, the authorized device 720 may alternatively obtain user information from a physical identification 740 that is associated with the digital identification 132.

The physical identification 740 may be an identification card that is issued by the issuing authority that also issues the digital identification 132. For instance the physical identification 740 may be associated with the user entry within the digital identification database 112 during the enrollment process. In some instances, instead of being a physical identification card, the physical identification 740 may additionally or alternatively be a sticker or label issued to a user during the digital identification enrollment process. In such implementations, examples of the physical identification 740 may include a bar code, a QR code, or other types of optically scannable labels that include encoded user information (e.g., a user identification number, a digital identification number, etc.). In other examples, the physical identification 740 may additionally or alternatively include user credential data (e.g., a checksum or a user-specific graphical pattern) that is used to match against user credential data that is included in the user entry within the digital identification database 112.

The authorized device 720 may use optical scanning techniques to extract user information from the physical identification. In some instances, the authorized device 720 may initially capture an image of the physical identification 740 and use optical recognition techniques to extract the user information that is displayed on the physical identification. For instance, as depicted in FIG. 7C, the authorized device 720 may extract a user identifier 742 that may be included in the physical identification. The extracted user identifier 742 may then be transmitted to the authorized agency server 120.

The authorized agency server 120 may utilize the user identifier 742 to query the digital identification database 112 and identify the corresponding user entry for the user associated with the user identifier 742. For instance, the user entry may specify the digital identification 132, and information related to the digital identification such as, for example, the current security status assigned to the digital identification, the most recent encrypted user data pages 724, the checksum 744, or the decryption key 746 as depicted in FIG. 7C. The extracted information from the digital identification database 112 may be used to perform the validation of the digital identification 132 using substantially similar techniques as described previously with respect to FIGS. 7A-7B. In this regard, the system 7000 may be used to validate the digital identification 132 of the user even in the absence of the user device 130.

Figure 7D:
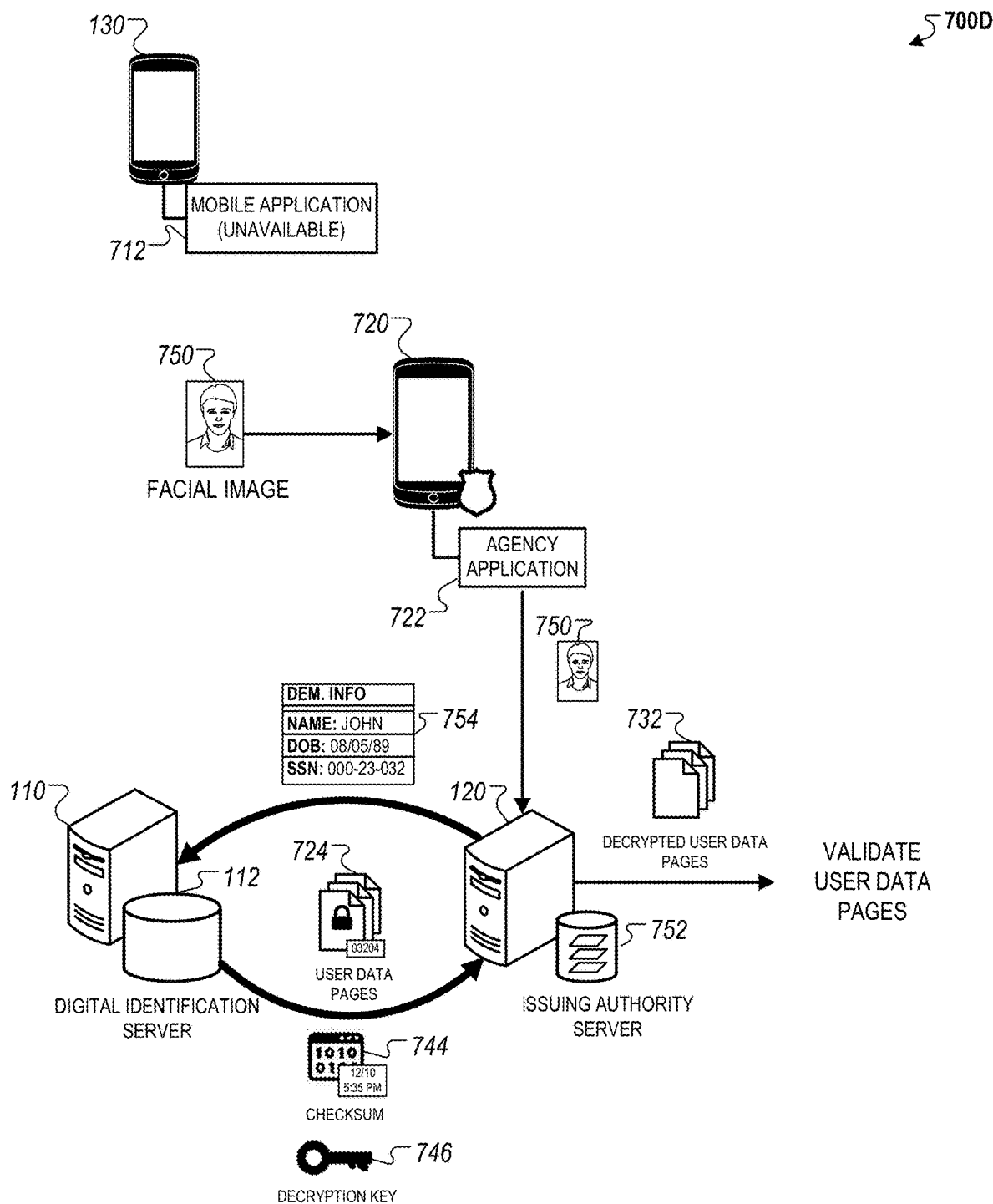

Referring now to FIG. 7D, the system 700D may be used to validate user information from a facial image 750 for a user when the user device 130 and the physical identification 740 is either inaccessible or otherwise unavailable. For instance, the system 700D may be used in circumstances where the user device 130 has either been lost or stolen and the user also does not have any other indicator that may be used to identify the digital identification 132. In such instances, because user data pages from the digital identification 132 are unable to be accessed, the authorized device 720 may alternatively obtain user information from the facial image 750 of the user.

As depicted in FIG. 7D, the facial image 750 may be an image of the user's face that is captured by the authorized device 720. For instance, the facial image 750 may be captured by a camera of the authorized device 720 and transmit the captured photo to the issuing authority server 120.

After receiving the captured facial image 750, the issuing authority server 120 may use facial recognition techniques to extract a set of facial features that are used to identify the identity of the user in the facial image 750. For instance, the issuing authority server 120 may include a facial recognition engine that is capable of detecting registration points within the facial image, normalizing the facial image 750, and extracting a set of candidate facial features. The facial recognition engine of the issuing authority server 120 may additionally be configured to use a facial recognition database 752 that includes reference feature templates that were generated during a digital identification enrollment or an identification issuance process. For example, the reference feature templates may be generated for a photograph of the user to be included in either the digital identification 132 or the physical identification 740. The facial recognition database 752 may additionally include information associated with a plurality of users that are enrolled in the digital identification program (e.g., name, date of birth, social security number, etc.).

After receiving the facial image 750, the facial recognition engine of the issuing authority server 120 may compare the candidate feature templates extracted from the facial image 750 to the reference facial images included in the facial recognition database 752, identify the user included in the facial image 750 and associated demographic information 754 of the user included in the facial recognition database 752. The demographic information 754 may then be used to query the digital identification database 112 to extract user information associated with the digital identification. For instance, as depicted in FIG. 7D, the demographic information 754 may be used to extract the encrypted user data pages 724, the checksum 744, and the decryption key 746. The issuing authority server 120 may then perform the validation of the digital identification 132 associated with the facial image 750 using substantially similar techniques to those described previously with respect to FIG. 7C.

In some implementations, the authorized device 720 may be configured to perform the facial recognition of the facial image 750. In such implementations, the agency application 722 may include a facial recognition module that is configured to exchange data transmissions with the facial recognition database 752. In addition, the facial recognition module may receive a set of computer-implemented protocols from the issuing authority server 120 that include instructions on particular feature templates to extract from the facial image 750.

In some implementations, the validation techniques, as depicted in FIGS. 7A-7E, may additionally include a "match fail" transmission feature in response determining that the variable checksum 724a does not have a matching checksum 744 within the digital identification server 110. In such implementations, the issuing authority server 120 may additionally store the extracted encrypted user data pages 724 that do not have a matching checksum 744 within a cached directory for additional investigations (e.g., for fraud, counterfeiting, hacking, or other circumstances that may compromises the validity of the digital identification 132).

Although FIGS. 7A-7E depict example validation techniques, in some implementations, additional techniques may be used to validate user information included in the digital identification 132. In one example, an unsecured encryption checksum validation service may include a user application framework that is capable of accepting a user variable key encryption package via a visual, digital, audio transfer method. In such an example, a first user may validate a user device of a second user using a Software as a Service (SaaS) authentication service. The SaaS authentication service may be used to receive push notifications of user-based encryption of checksum data. The SaaS authentication service may then be used to validate the checksum data and provide a signal transmission indicating the results of the validation. In some instances, the first user may be a law enforcement officer, a transportation security official, or other authorized personnel associated with the issuing authority. In this regard, the SaaS authentication service may be used to enable users and authorized individuals to validate user information within the digital identification 132.

Figure 7E:
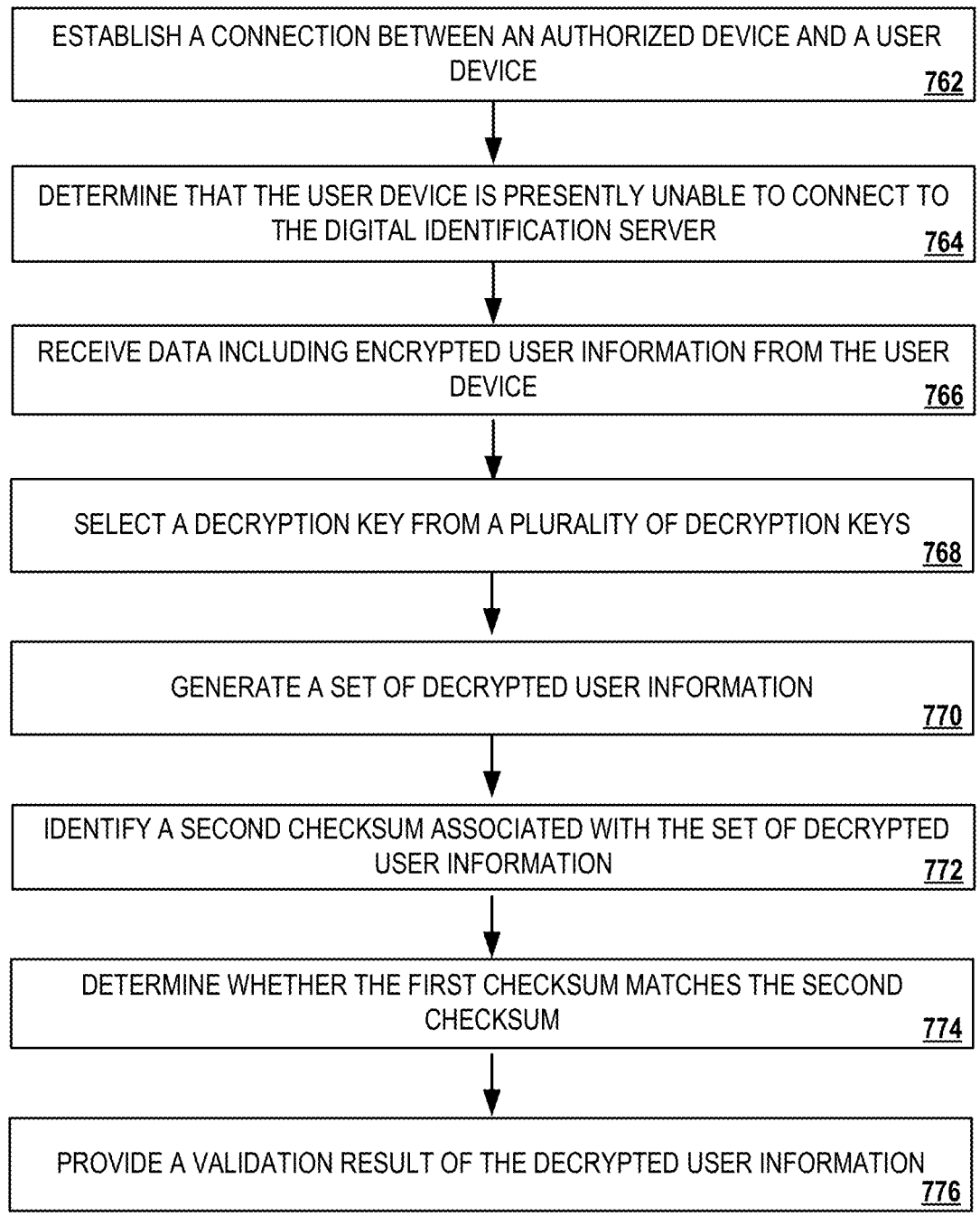
FIG. 7E illustrates a flowchart of an example process for validating user information included in a digital identification.

FIG. 7E is a flowchart of an example process 700E for offline validation of user data included in a digital identification. Briefly, the process 700E may include establishing a connection between an authorized device and the user device (762), determining that a user device is presently unable to connect to a digital identification server (764), receiving data including encrypted user information from the user device (766), selecting a decryption key from a plurality of decryption keys (768), generating a set of decrypted user information (770), identifying a second checksum associated with the set of decrypted user information (772), determining whether the first checksum matches the second checksum (774), and providing a validation result of the decrypted user information (776).

In more detail, the process 700E may include establishing a connection between an authorized device and the user device (762). For instance, the authorized device 720 may establish a connection between the user device 130 and the authorized device 720. In some implementations, the established connection may be a proximity-based connection such as, for example, a Bluetooth connection, near-field communication, or an infrared connection. The established connection may permit the exchange of visual information (e.g., pictures) or audible information (e.g., sound recordings).

The process 700E may include determining that a user device is presently unable to connect to a digital identification server (764). For instance, the authorized device 720 may determine that the user device 130 of a user is presently unable to connect to the digital identification server 110.

The process 700E may include receiving data including encrypted user information from the user device (766). For instance, the authorized device 720 may receive, from the user device 130, data including an identifier associated with the user, the encrypted user data pages 724 from the digital identification 132, and a timestamp of encryption. In addition, the encrypted user data pages 724 may include the variable checksum 724a.

The process 700E may include selecting a decryption key from a plurality of decryption keys (768). For instance, the issuing authority server 730 may select, from a plurality of decryption keys stored on the digital identification server 110 and based at least on the timestamp of encryption included in the encrypted user data pages 724, the decryption key 746 that corresponds to an encryption used to encrypt the encrypted user data pages 724.

The process 700E may include generating a set of decrypted user information (770). For instance, the authorized device 720 may generate the set of decrypted user data pages 732 from the digital identification 132 on the user device 130 based at least on decrypting the encrypted user data pages 724 from the digital identification 132 on the user device 130 using the decryption key 746.

The process 700E may include identifying a checksum associated with the set of decrypted used information (772).

In some implementations, the authorized device 720 may identify the variable checksum 744 from a list of cached checksums, stored on the authorized device 720, and associated with particular timestamps of encryption. In such implementations, the authorized device 720 may initially receive a transmission from the issuing authority server 120 that includes a list of checksums that is then cached on the authorized device 720. In such implementations, after establishing a connection with the user device 130, the authorized device 720 is capable of identifying the variable checksum 744 without presently having network connectivity. Additionally or alternatively, the authorized device 720 may generate the checksum based on identifying an appropriate protocol, for generating a checksum from user information, that is associated with a time that corresponds to the time of encryption from multiple stored protocols each associated with a different corresponding time, and generate the checksum using the identified protocol and the decrypted user information.

Alternatively, in other implementations where the authorized device 720 presently has network connectivity to the issuing authority server 120, the authorized device 720 may identify the checksum 744a based on querying the issuing authority server 120 for the appropriate checksum for the timestamp of encryption associated with the encrypted user data pages 724 or querying the issuing authority for a protocol, corresponding to the timestamp of encryption, for generating a checksum from user information, and then generating the checksum using the protocol and the decrypted user information.

The process 700E may include determining whether the first variable credential matches the second variable credential (774). In some instances, the authorized device 720 may determine that the variable checksum 724a does not match the variable checksum 744. In such instances, the authorized device 720 may determine that the user information included within the decrypted user data pages is either outdated or invalid. Alternatively, in other instances, the authorized device 720 may determine that the variable checksum 724a matches the variable checksum 744. In such instances, the authorized device 720 may determine that the user information included within the decrypted user data pages accurately reflects the vetted user information within the digital identification server 110.

In some implementations, the process 700E may additionally include designating the set of decrypted user information as unverified information. For instance, in response to determining that the variable checksum 724a does not match the variable checksum 744, the authorized device 720 may designate the set of decrypted user pages 732 within the digital identification 132 on the user device 130 as unverified information.

The process 700E may include providing a validation result of the decrypted user information (776). For instance, the authorized device 720 may provide a notification to indicating that the decrypted user data pages 732 within the digital identification 132 on the user device 130 includes unverified information.

As described throughout, computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving, by a computing device, an electronic identification document having a security status, wherein the security status of the electronic identification document is stored in a database and periodically updated, the security status including a timestamp associated with a most recent update of the security status and one or more most recent values of user credential data;
   in response to receiving the electronic identification document, extracting, by the computing device, embedded user credential data that is included with the electronic identification document;
   obtaining, by the computing device, encrypted data that is included in the embedded user credential data;
   receiving, by the computing device, a decryption key that is variably designated based on the security status of the electronic identification document;
   decrypting, by the computing device, the encrypted data using the decryption key; and
   based on the decrypted data, determining, by the computing device, whether the electronic identification document is valid.

2. The method of claim 1, comprising:
   receiving, by the computing device, data for extracting the embedded user credential data that is included with the electronic identification document,
   wherein the computing device extracts the embedded user credential data using the data for extracting the embedded user credential data.

3. The method of claim 1, wherein the embedded user credential data comprises:
   a graphical watermark included in the electronic identification document;
   an audio watermark embedded in audio outputted by an electronic device presenting the electronic identification document; or
   a QR code included in the electronic identification document.

4. The method of claim 1, wherein determining whether the electronic identification document is valid comprises:
   transmitting, by the computing device and to an additional computing device, the decrypted data; and
   receiving, by the computing device and from the additional computing device, data indicating that the electronic identification document is valid.

5. The method of claim 1, wherein determining whether the electronic identification document is valid comprises:
   transmitting, by the computing device and to an additional computing device, the decrypted data; and
   receiving, by the computing device and from the additional computing device, data indicating that the electronic identification document is invalid.

6. The method of claim 1, wherein an electronic device presenting the electronic identification document is configured to update the embedded user credential data in response to receiving data indicating the security status of the electronic identification document.

7. The method of claim 1, wherein the encrypted data that is included in the embedded user credential data includes data identifying an individual depicted in the electronic identification document.

8. A system comprising:
   one or more computers; and
   one or more storage devices storing instructions that are operable, when executed by the one or more computers, to cause the one or more computers to perform operations comprising:
      receiving, by a computing device, an electronic identification document having a security status;
      in response to receiving the electronic identification document, extracting, by the computing device, embedded user credential data that is included with the electronic identification document;
      obtaining, by the computing device, encrypted data that is included in the embedded user credential data;
      receiving, by the computing device, a decryption key that is variably designated based on the security status of the electronic identification document;
      decrypting, by the computing device, the encrypted data using the decryption key; and
      based on the decrypted data, determining, by the computing device, whether the electronic identification document is valid; and
   a database, wherein the security status of the electronic identification document is stored in the database and periodically updated, the security status including a timestamp associated with a most recent update of the security status and one or more most recent values of the user credential data.

9. The system of claim 8, wherein the operations comprise:
   receiving, by the computing device, data for extracting the embedded user credential data that is included with the electronic identification document,
   wherein the computing device extracts the embedded user credential data using the data for extracting the embedded user credential data.

10. The system of claim 8, wherein the embedded user credential data comprises:
    a graphical watermark included in the electronic identification document;
    an audio watermark embedded in audio outputted by an electronic device presenting the electronic identification document; or
    a QR code included in the electronic identification document.

11. The system of claim 8, wherein determining whether the electronic identification document is valid comprises:

transmitting, by the computing device and to an additional computing device, the decrypted data; and receiving, by the computing device and from the additional computing device, data indicating that the electronic identification document is valid.

12. The system of claim 8, wherein determining whether the electronic identification document is valid comprises:

transmitting, by the computing device and to an additional computing device, the decrypted data; and receiving, by the computing device and from the additional computing device, data indicating that the electronic identification document is invalid.

13. The system of claim 8, wherein an electronic device presenting the electronic identification document is configured to update the embedded user credential data in response to receiving data indicating the security status of the electronic identification document.

14. The system of claim 8, wherein the encrypted data that is included in the embedded user credential data includes data identifying an individual depicted in the electronic identification document.

15. A non-transitory computer-readable medium storing software comprising instructions executable by one or more computers which, upon such execution, cause the one or more computers to perform operations comprising:

receiving, by a computing device, an electronic identification document having a security status, wherein the security status of the electronic identification document is stored in a database and periodically updated, the security status including a timestamp associated with a most recent update of the security status and one or more most recent values of user credential data;

in response to receiving the electronic identification document, extracting, by the computing device, embedded user credential data that is included with the electronic identification document;

obtaining, by the computing device, encrypted data that is included in the embedded user credential data;

receiving, by the computing device, a decryption key that is variably designated based on the security status of the electronic identification document;

decrypting, by the computing device, the encrypted data using the decryption key; and based on the decrypted data, determining, by the computing device, whether the electronic identification document is valid.

16. The medium of claim 15, wherein the operations comprise:

receiving, by the computing device, data for extracting the embedded user credential data that is included with the electronic identification document, wherein the computing device extracts the embedded user credential data using the data for extracting the embedded user credential data.

17. The medium of claim 15, wherein the embedded user credential data comprises:

a graphical watermark included in the electronic identification document;

an audio watermark embedded in audio outputted by an electronic device presenting the electronic identification document; or a QR code included in the electronic identification document.

18. The medium of claim 15, wherein determining whether the electronic identification document is valid comprises:

transmitting, by the computing device and to an additional computing device, the decrypted data; and receiving, by the computing device and from the additional computing device, data indicating that the electronic identification document is valid.

19. The medium of claim 15, wherein determining whether the electronic identification document is valid comprises:

transmitting, by the computing device and to an additional computing device, the decrypted data; and receiving, by the computing device and from the additional computing device, data indicating that the electronic identification document is invalid.

20. The medium of claim 15, wherein an electronic device presenting the electronic identification document is configured to update the embedded user credential data in response to receiving data indicating the security status of the electronic identification document.

* * * * *